United States Patent
Maeda

(10) Patent No.: US 7,952,741 B2
(45) Date of Patent: May 31, 2011

(54) INFORMATION-PROCESSING SYSTEM CAUSING A PLURALITY OF PROCESSING EXECUTION APPARATUSES TO EXECUTE A PLURALITY OF KINDS OF PROCESSING FOR ONE KIND OF DATA

(75) Inventor: Toshihiro Maeda, Sakai (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 11/808,095

(22) Filed: Jun. 6, 2007

(65) Prior Publication Data
US 2008/0104670 A1 May 1, 2008

(30) Foreign Application Priority Data
Nov. 1, 2006 (JP) .................................. 2006-297847

(51) Int. Cl.
*G06D 3/12* (2006.01)
(52) U.S. Cl. .......................... 358/1.15; 709/242; 709/223
(58) Field of Classification Search ................. 358/1.15; 709/242, 223
See application file for complete search history.

(56) References Cited

U.S. PATENT DOCUMENTS

| | | | | |
|---|---|---|---|---|
| 5,918,226 A | * | 6/1999 | Tarumi et al. .......................... 1/1 |
| 6,424,429 B1 | * | 7/2002 | Takahashi et al. ............. 358/1.16 |
| 7,412,520 B2 | * | 8/2008 | Sun ................................. 709/227 |
| 7,626,717 B2 | * | 12/2009 | Rai et al. ...................... 358/1.15 |
| 2002/0060807 A1 | * | 5/2002 | Gassho et al. ................ 358/1.15 |
| 2002/0118387 A1 | * | 8/2002 | Patton .......................... 358/1.15 |
| 2002/0184518 A1 | | 12/2002 | Foster et al. |
| 2003/0123084 A1 | * | 7/2003 | Brossman et al. ............ 358/1.15 |
| 2003/0161001 A1 | * | 8/2003 | Ueda et al. .................... 358/1.15 |
| 2004/0027611 A1 | * | 2/2004 | Leiman et al. ............... 358/1.15 |
| 2005/0027825 A1 | | 2/2005 | Hikawa et al. |
| 2005/0105129 A1 | * | 5/2005 | Takahashi .................... 358/1.15 |

FOREIGN PATENT DOCUMENTS

JP 07-20027 1/1995

(Continued)

OTHER PUBLICATIONS

Suda Shinichiro, Method and System for large scale distributed information processing, Jun. 30, 1995 JP 09-016527 English Translation.*

(Continued)

*Primary Examiner* — Twyler L Haskins
*Assistant Examiner* — Dennis Dicker
(74) *Attorney, Agent, or Firm* — Buchanan Ingersoll & Rooney PC

(57) ABSTRACT

A PC has a data receiving portion to store data in the HDD, and a function ticket generating portion to store in the HDD a function ticket that defines the state of processing executed for the data. Each of a plurality of MFPs has a function ticket acquiring portion to acquire the function ticket, an object processing determining portion to determine executable object processing among processing defined by the function ticket, a data acquiring portion to acquire the data, an object processing executing portion to execute the object processing for the data, a data updating portion to update the data stored in the PC with data for which the object processing has been executed, and a function ticket updating portion to update the state of processing defined by the function ticket stored in the PC with an executed state.

10 Claims, 16 Drawing Sheets

FOREIGN PATENT DOCUMENTS

| | | |
|---|---|---|
| JP | 9-16137 | 1/1997 |
| JP | 9-16527 | 1/1997 |
| JP | 11-316665 A | 11/1999 |
| JP | 2002-73576 | 3/2002 |
| JP | 2003-99240 | 4/2003 |
| JP | 2004-265425 | 9/2004 |
| JP | 2004-287861 | 10/2004 |
| JP | 2005-173764 | 6/2005 |
| JP | 2005-222284 | 8/2005 |
| JP | 2006-244146 | 9/2006 |

OTHER PUBLICATIONS

Office Action from corresponding Japanese Application No. 2006-297847, dated Sep. 30, 2008.

* cited by examiner

F I G. 4
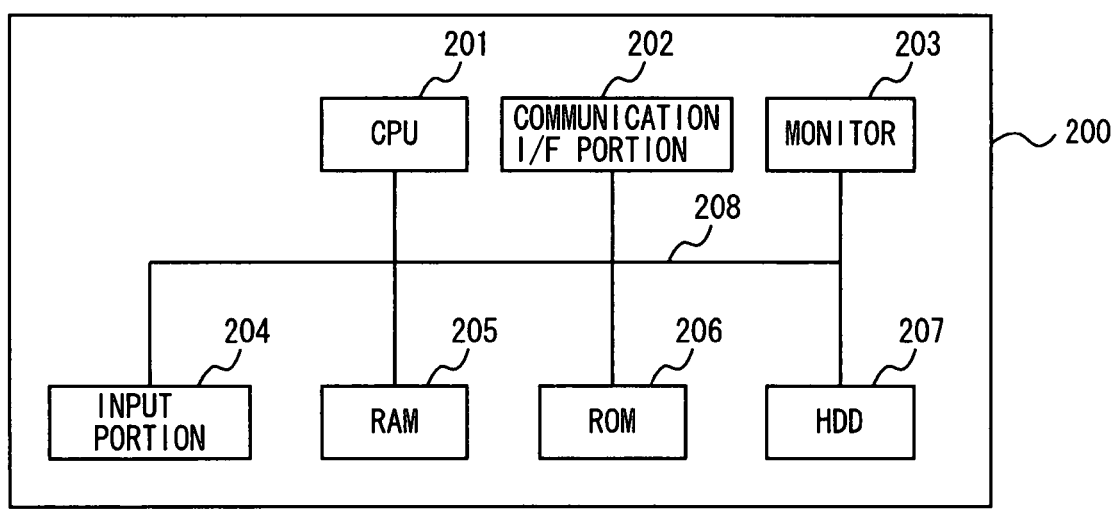

FIG. 5
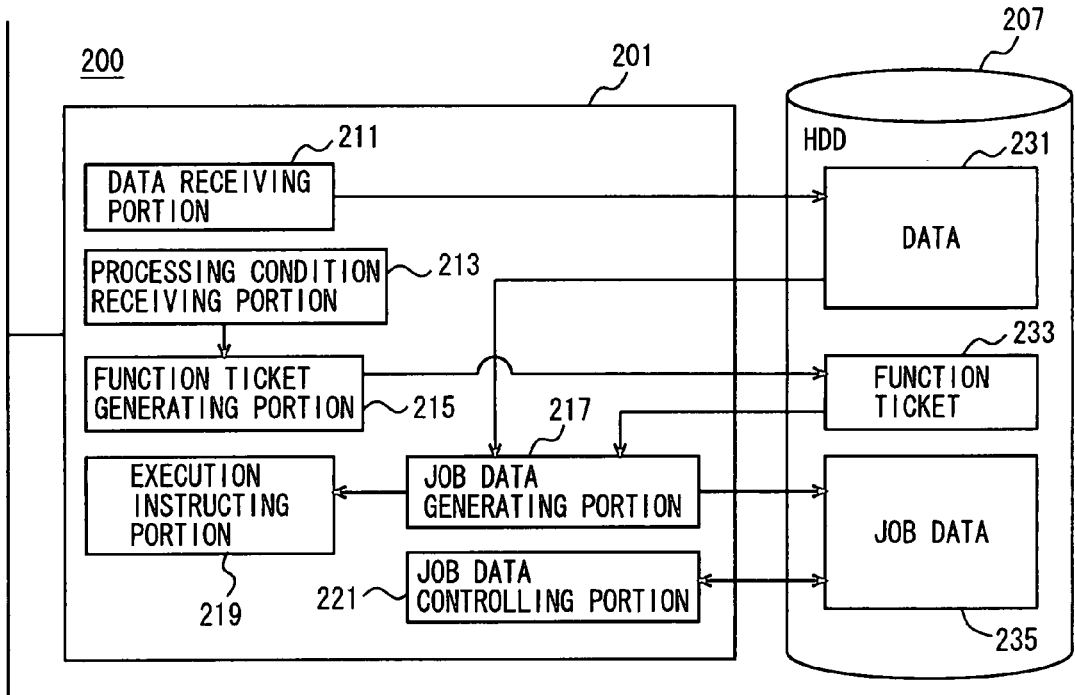
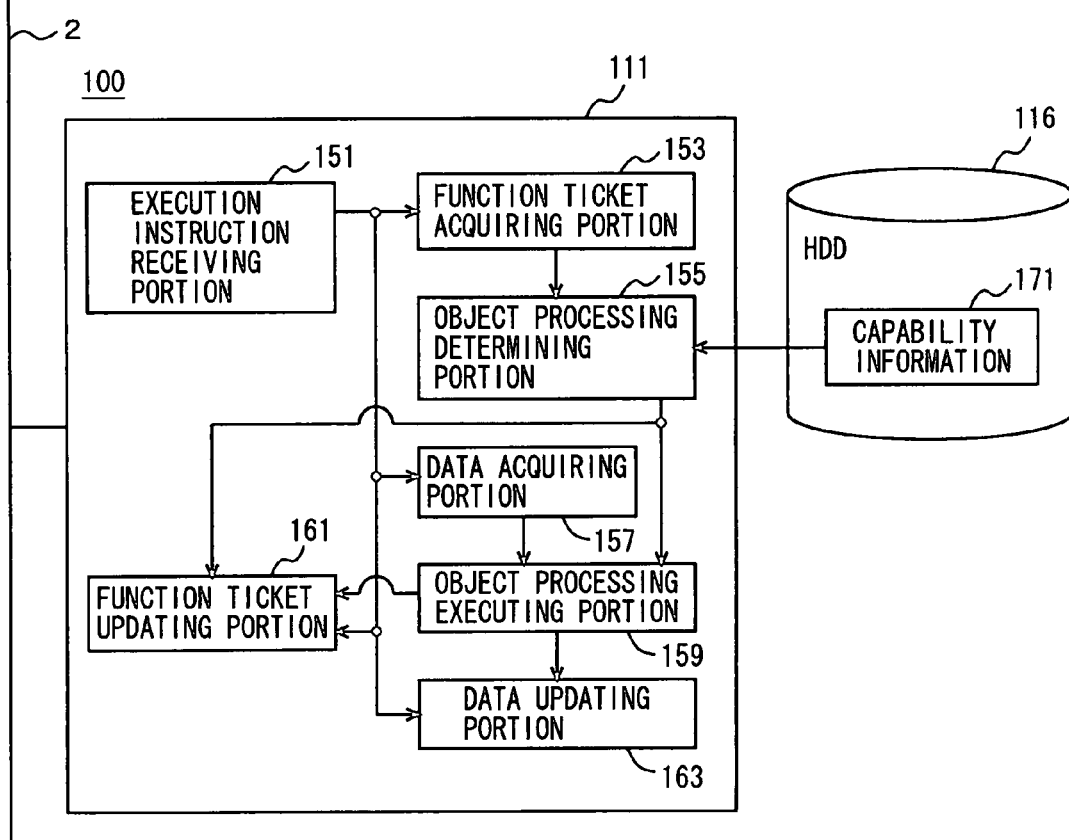

FIG. 6

```
<Ticket No>
     1
</Ticket No>
<Function>
     <Status>     Close </Status>
     <Device>     MFP-D </Device>
     <Function>   OCR   </Function>
     <Parameter>  Type1 </Parameter>
</Function>
<Function>
     <Priority>   1     </Priority>
     <Status>     Open  </Status>
     <Function>   RIP   </Function>
     <Parameter>  PDF   </Parameter>
</Function>
<Function>
     <Priority>   2     </Priority>
     <Status>     Open  </Status>
     <Function>   N-up  </Function>
     <Parameter>  4-up  </Parameter>
</Function>
<Function>
     <Priority>   Last  </Priority>
     <Status>     Open  </Status>
     <Function>   Print </Function>
     <Device>     MFP-A </Device>
</Function>
```

F I G. 7

|  | PRINT JOB | TRANSFER JOB |
|---|---|---|
| USER DESIGNATION | PRINT OUTPUT FROM MFP-A | TRANSFER FROM MFP-A TO MFP-B |
| <Function> | Print | Download |
| <Device> | MFP-A | MFP-A |
| <Priority> | Last | Last |
| <Parameter> | - | MFP-B |

FIG. 8

| JOB NUMBER (JOB IDENTIFICATION INFORMATION) | ACCESS INFORMATION | | FUNCTION TICKET NUMBER (FUNCTION TICKET IDENTIFICATION INFORMATION) | FILE NAME (DATA IDENTIFICATION INFORMATION) |
|---|---|---|---|---|
| | Status | APPARATUS IDENTIFICATION INFORMATION | | |
| 1 | Open | — | 100 | 1001.jpeg |
| 2 | Checkout | MFP-A | 101 | 1002.pdf |
| 3 | Open | — | 102 | 1003.txt |
| 4 | Checkout | MFP-B | 103 | 1004.giff |
| 5 | Checkout | MFP-C | 104 | 1005.pdg |

FIG. 9

```
<Function>
    <Function>   OCR   </Function>
    <Parameter>  Type1 </Parameter>
    <Parameter>  Type2 </Parameter>
    <Parameter>  Type3 </Parameter>
</Function>
<Function>
    <Function>   RIP   </Function>
    <Parameter>  PDF   </Parameter>
    <Parameter>  PCL   </Parameter>
    <Parameter>  PS    </Parameter>
</Function>
<Function>
    <Function>   N-up  </Function>
    <Parameter>  2-up  </Parameter>
    <Parameter>  4-up  </Parameter>
    <Parameter>  6-up  </Parameter>
    <Parameter>  8-up  </Parameter>
</Function>
```

INFORMATION-PROCESSING SYSTEM CAUSING A PLURALITY OF PROCESSING EXECUTION APPARATUSES TO EXECUTE A PLURALITY OF KINDS OF PROCESSING FOR ONE KIND OF DATA

This application is based on Japanese Patent Application No. 2006-297847 filed with Japan Patent Office on Nov. 1, 2006, the entire content of which is hereby incorporated by reference.

BACKGROUND OF THE INVENTION

1. Field of the Invention

The present invention relates to an information-processing system, an information-processing apparatus, a processing execution apparatus, an information-processing method, and a program stored in a computer-readable recording medium. More specifically, the invention relates to an information-processing system causing a plurality of processing execution apparatuses to execute a plurality of kinds of processing for one kind of data, an information-processing apparatus and a processing execution apparatus that constitute the information-processing system, an information-processing method executed in the information-processing apparatus and the processing execution apparatus, and a program stored in a computer-readable recording medium and executed in the information-processing apparatus and the processing execution apparatus.

2. Description of the Related Art

In recent years, improved network techniques have made it common to connect a plurality of information-processing apparatuses such as computers and image-forming apparatuses to networks. For this form of use, a technique is being developed for causing a small load apparatus among the plurality of information-processing apparatuses to execute processing. Japanese Patent Application Publication No. 11-316665, for example, describes the following technique. A work station makes a print demand to printers registered into a group. A printer that has received the print demand inquires the work station about printability when the printing portion of the printer becomes available. Inquired about printability, the work station, when the object job is still not printed by any other printers, makes a response denoting the object job as printable and causes the inquiring printer to print the object job. When the object job is already printed by any of the other printers, the work station makes a response denoting the print job as unprintable. Thus, a small load printer among the plurality of printers is caused to print a job.

In the technique described in Japanese Patent Laying-Open No. 11-316665, however, the first printer to make an inquiry for printability is caused to execute all the processing defined by the print job even when the print job defines a plurality of kinds of processing, and no consideration is paid by the publication to the case where the printer is unable to execute some of the plurality of kinds of processing defined by the print job, or to distributing the load of the plurality of kinds of processing defined by the print job. In addition, when the work station, which makes the print job, receives an inquiry about printability from the printer, the work station needs to check out the state of the print job to make a response denoting the printability of the print job. Thus, problems occurred including an increase in load against the work station making the print job.

SUMMARY OF THE INVENTION

The present invention has been accomplished to solve the above problems, and it is an object of the present invention to provide an information-processing system, an information-processing apparatus, a processing execution apparatus, an information-processing method, and a program stored in a computer-readable recording medium that are capable of distributing load among a plurality of apparatuses.

In order to accomplish the above object, an information-processing system according to an aspect of the present invention includes an instructing apparatus to instruct execution of processing and a plurality of processing execution apparatuses to execute processing in accordance with an instruction for executing processing. The instructing apparatus comprises: a processing condition receiving portion to receive data to be processed and at least one piece of processing identification information for identifying at least one piece of processing to be executed for the data; a definition data generating portion to generate definition data defining state information denoting a state of processing for each of the at least one piece of received processing identification information; a definition data storing portion to store the definition data; and a data storing portion to store the data. The plurality of processing execution apparatuses each comprise: a definition data acquiring portion to acquire the definition data; an object processing determining portion to determine executable object processing among the at least one piece of processing defined by the acquired definition data; a data acquiring portion to acquire the data; a processing executing portion to execute the object processing fort the acquired data; a data update instructing portion to, when the object processing is data processing, instruct to update the data stored in the data storing portion of the instructing apparatus with processed data having undergone the object processing executed by the processing executing portion; and a definition data update instructing portion to instruct to update state information corresponding to the object processing with an executed state, the object processing being defined by the definition data stored in the definition data storing portion of the instructing apparatus.

According to another aspect of the present invention, an information-processing apparatus comprises: a processing condition receiving portion to receive data to be processed and at least one piece of processing identification information for identifying at least one piece of processing to be executed for the data; a definition data generating portion to generate definition data defining state information denoting a state of processing for each of the at least one piece of received processing identification information; a definition data storing portion to store the definition data; and a data storing portion to store the data; a transmission demand receiving portion to receive a transmission demand for the data from either one of the plurality of processing execution apparatuses for executing the processing; a transmitting portion to transmit, upon receiving the transmission demand, the data stored in the data storing portion to, among the plurality of processing execution apparatuses, a particular apparatus that has transmitted the transmission demand; a data updating portion to, upon receiving data identification information for identifying the data and processed data from the particular apparatus, update the data identified by the received data identification information and stored in the data storing portion with the processed data; and a definition data updating portion to, upon receiving definition data identification information for identifying the definition data and the processing identification information from the particular apparatus, update to a processed state the state information defined by the definition data identified by the received definition data identification information and corresponding to the received processing identification information.

According to another aspect of the present invention, a processing execution apparatus comprises: an execution instruction receiving portion to receive an execution instructing information including: definition data identification information for identifying definition data defining state information denoting a state of processing for each of at least one piece of processing identification information for identifying at least one piece of processing to be executed for data stored in an instructing apparatus; and data identification information for identifying the data, the execution instructing information being received from the instructing apparatus; a definition data acquiring portion to acquire the definition data identified by the definition data identification information included in the received execution instructing information; an object processing determining portion to determine executable object processing among the at least one piece of processing defined by the acquired definition data; a data acquiring portion to acquire from the instructing apparatus the data identified by the data identification information included in the received execution instructing information; a processing executing portion to execute the object processing for the acquired data; a data update instructing portion to, when the object processing is data processing, instruct to update the data stored in the instructing apparatus with processed data having undergone the object processing executed by the processing executing portion; and a definition data update instructing portion to instruct to update state information corresponding to the object processing with an executed state, the object processing being defined by the definition data stored in the instructing apparatus.

According to another aspect of the present invention, a processing executing method for executing processing in an information-processing system including an instructing apparatus to instruct execution of processing and a plurality of processing execution apparatuses to execute processing in accordance with an instruction for executing processing. The method causes the instructing apparatus to execute steps comprising: receiving data to be processed and at least one piece of processing identification information for identifying at least one piece of processing to be executed for the data; generating definition data defining state information denoting a state of processing for each of the at least one piece of received processing identification information; storing the definition data; and storing the data. The method causes each of the plurality of processing execution apparatuses to execute steps comprising: acquiring the definition data; determining executable object processing among the at least one piece of processing defined by the acquired definition data; acquiring the data; executing, upon receiving the data, the object processing for the acquired data; instructing, when the object processing is data processing, to update the data stored in the instructing apparatus with processed data having undergone the object processing; and instructing to update state information corresponding to the object processing with an executed state, the object processing being defined by the definition data stored in the instructing apparatus.

According to another aspect of the present invention, a program stored in a computer-readable recording medium and causing a computer to execute processing comprises steps of: receiving object data to be processed and at least one piece of processing identification information for identifying at least one piece of processing to be executed for the object data; generating and storing definition data defining state information denoting a state of processing for each of the at least one piece of received processing identification information; storing the definition data; receiving a transmission demand for the object data from either one of the plurality of processing execution apparatuses for executing the processing; transmitting, upon receiving the transmission demand, the stored object data to, among the plurality of processing execution apparatuses, a particular apparatus that has transmitted the transmission demand; updating, upon receiving data identification information for identifying the object data and processed object data from the particular apparatus, the object data identified by the received data identification information and stored in the data storing portion with the processed object data; and updating, upon receiving definition data identification information for identifying the definition data and the processing identification information from the particular apparatus, with a processed state the state information defined by the definition data identified by the received definition data identification information and corresponding to the received processing identification information.

According to another aspect of the present invention, a program stored in a computer-readable recording medium and causing a computer to execute processing comprises steps of: receiving an execution instructing information including: definition data identification information for identifying definition data defining state information denoting a state of processing for each of at least one piece of processing identification information for identifying at least one piece of processing executed for object data stored in a processing instructing apparatus; and data identification information for identifying the object data, the execution instructing information being received from the processing instructing apparatus; acquiring the definition data identified by the definition data identification information included in the received execution instructing information; determining executable object processing among the at least one piece of processing defined by the acquired definition data; acquiring from the processing instructing apparatus the object data identified by the data identification information included in the received execution instructing information; executing the object processing for the acquired object data; instructing, when the object processing is data processing, the processing instructing apparatus to update the object data stored in the processing instructing apparatus with processed data having undergone the object processing executed by the processing executing portion; and instructing said processing instructing apparatus to update state information corresponding to the object processing with an executed state, the object processing being defined by the definition data stored in the processing instructing apparatus.

According to another aspect of the present invention, a job instructing apparatus comprises: a storing apparatus to store job data defining a job for executing a plurality of pieces of processing for image data and image data for which the job is intended; and a processor executing processing comprising steps of: transmitting an execution instruction for the job to a plurality of job executing apparatuses; receiving a job transmission demand from one of the plurality of job executing apparatuses for each of a plurality of pieces of processing included in the job; and transmitting the job data and the image data to the job executing apparatus on condition that processing for which the job transmission demand is intended for is yet to be executed.

According to another aspect of the present invention, a job processing apparatus comprises a processor executing processing comprising steps of: receiving from a job instructing apparatus an execution instruction for a job for executing a plurality of pieces of processing for image data; judging for processing, among the plurality of pieces of processing included in the received job, that is executable by the job processing apparatus; and transmitting a job transmission demand to the job instructing apparatus for the processing judged to be executable by the job processing apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing an example of the hardware structure of a PC.

FIG. 5 is a functional schematic diagram showing the functions of the CPUs of the MFP and PC, together with information stored in the HDD.

FIG. 6 is a diagram showing an example of a function ticket.

FIG. 7 is a diagram showing an example of processing information generated when the apparatus to execute the last processing is identified.

FIG. 8 is a diagram showing an example of job data stored in a job processing queue.

FIG. 9 is a diagram showing an example of capability information.

DESCRIPTION OF THE PREFERRED EMBODIMENTS

Figure 1:
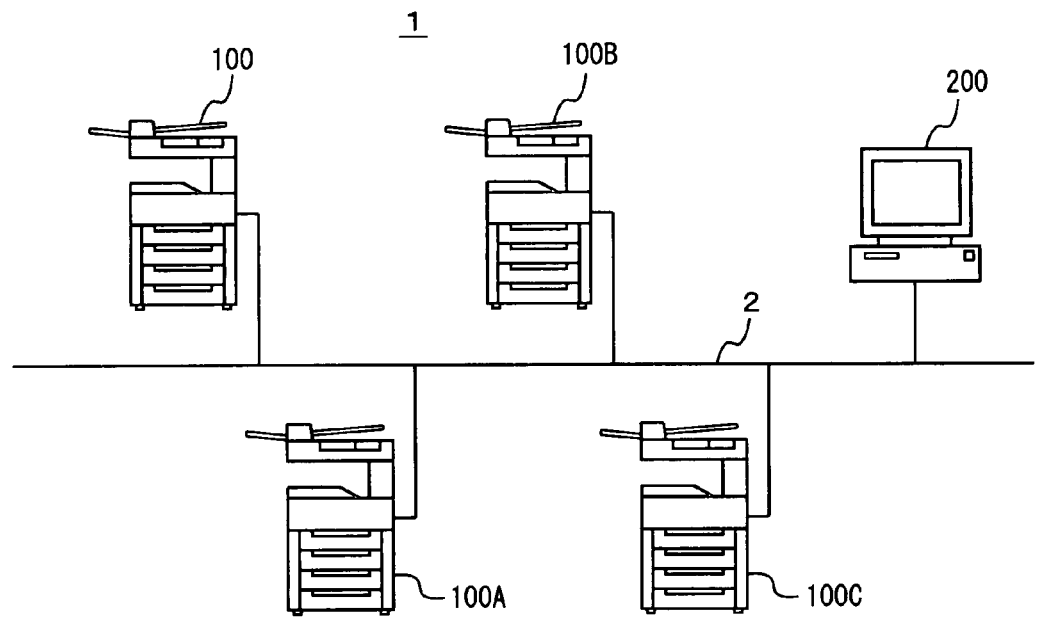
FIG. 1 is a schematic diagram of an information-processing system according to an embodiment of the present invention.

Embodiments of the present invention will be described below referring to the drawings. In the following description, parts having like functions and names will be denoted with like numerals, and therefore description thereof will not be repeated.

FIG. 1 is a schematic diagram of an information-processing system according to an embodiment of the present invention. Referring to FIG. 1, an information-processing system 1 includes compound machines (hereinafter referred to as MFPs) 100, 100A, 100B, and 100C, serving as information-processing apparatuses, and a personal computer (hereinafter referred to as a PC) 200, respectively connected to a network 2. The PC 200 is a general computer.

While in this embodiment the MFPs (Multi Functional Peripherals) 100, 100A, 100B, and 100C are taken as an example of the information-processing apparatus, the MFPs 100, 100A, 100B, and 100C can be replaced with other apparatuses having an information processing function such as scanners, image-forming apparatuses, facsimiles, and personal computers. The network 2 is a local area network (LAN), and the connection can be either by wire or radio. Also, the network 2 is not limited to a LAN and can be a wide area network (WAN), the public switched telephone network (PSTN), the Internet, or the like.

In the information-processing system 1 according to this embodiment, the MFPs 100, 100A, 100B, and 100C, and the PC 200 constitute a group. The number of the constituents of the group is not limited to five and can be any plural numbers. The functions of the MFPs 100, 100A, 100B, and 100C can be the same or different from one another. For example, the MFPs 100, 100A, 100B, and 100C basically include at least either one of the image reading function to read text and output image data, the image processing function to process image data, the image forming function to form an image onto a recording sheet such as paper on the basis of image data, the post-processing function to process the image-formed recording sheet such as hole punching and sorting, and the facsimile transmission/receiving function. In information-processing system 1, when the user inputs processing conditions and data into either one of the PC 200 and the MFPs 100, 100A, 100B, and 100C, the data is processed by the entire information-processing system 1 according to the processing conditions. For example, when processing conditions and data are input into the MFP 100, the processing conditions can include a function not possessed by the MFP 100 insofar as the function is possessed by the other MFPs 100A, 100B, and 100C, or the PC 200, and the data can be processed according to such processing conditions.

It is also possible that when the user inputs processing conditions and data into the PC 200, the PC transmits the processing conditions and the data to either one of the MFPs 100, 100A, 100B, and 100C, the data is processed by the entire MFPs 100, 100A, 100B, and 100C according to the processing conditions.

For simplicity of description, the example where image data and processing conditions including processing identification information for identifying the processing for executing the image data are input into the PC 200 and the processing for the image data is executed in either one of the MFPs 100, 100A, 100B, and 100C according to the processing conditions will be described here.

While the MFPs 100, 100A, 100B, and 100C have different functions, it will be assumed that the MFP 100 have all the functions. The structure of the MFP 100 will be described on the basis of the assumption.

Figure 2:
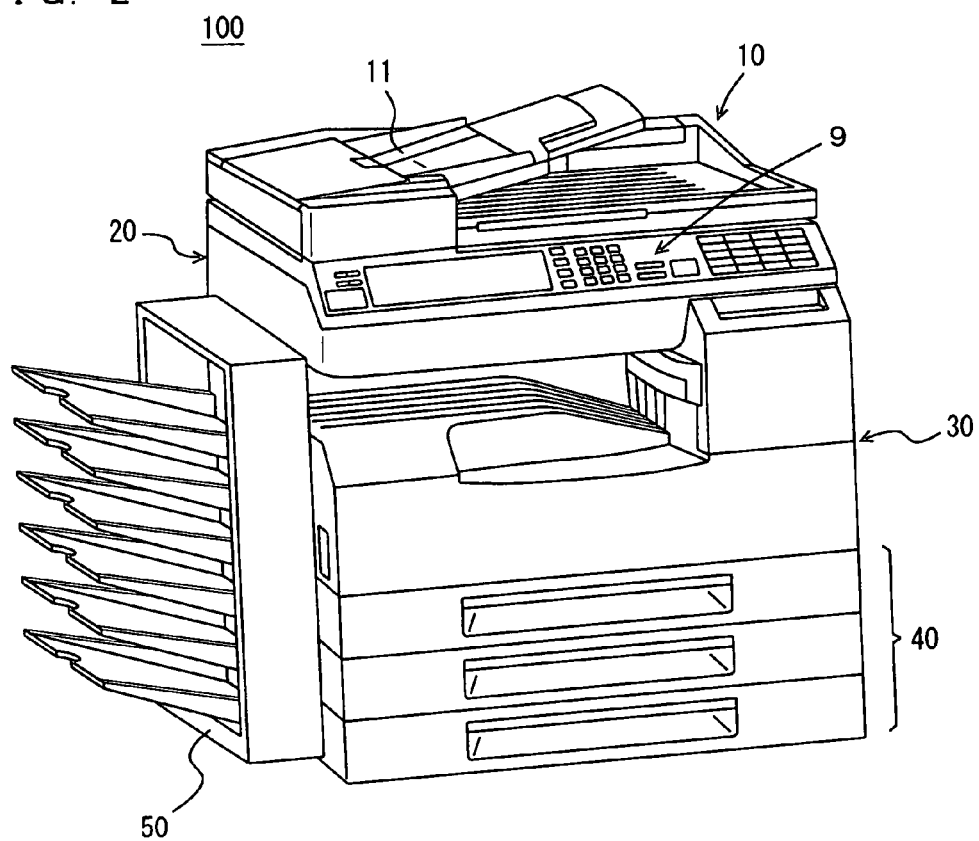
FIG. 2 is a perspective view of an MFP, showing the appearance of thereof.

FIG. 2 is a perspective view of the MFP, showing the appearance of thereof. Referring to FIG. 2, the MFP 100 includes an automatic document feeding device (ADF) 10, a text reading portion 20, an image-forming portion 30, a paper feeding portion 40, and a post-processing portion 50. The ADF 10 feeds a plurality of sheets of document paper placed on a paper feed tray 11 into the text reading portion 20 on a one-by-one basis. The text reading portion 20 optically reads image information such as photographs, characters, and pictures from the text in order to acquire image data.

The image-forming portion 30, upon input of the image data, forms an image onto a recording sheet on the basis of the image data. The image-forming portion 30 uses four colors, cyan, magenta, yellow, and black, for image formation. The paper feeding portion 40 stores recording sheets and supplies them to the image-forming portion 30 on a one-by-one basis. The post-processing portion 50 has a plurality of discharge trays and is capable of sorting the recording sheets when discharged. The post-processing portion 50 is equipped with a hole punching portion and a staple portion so that the discharged recording sheets can be hole-punched or stapled. The MFP 100 has an operation panel 9 on the top surface thereof.

Figure 3:
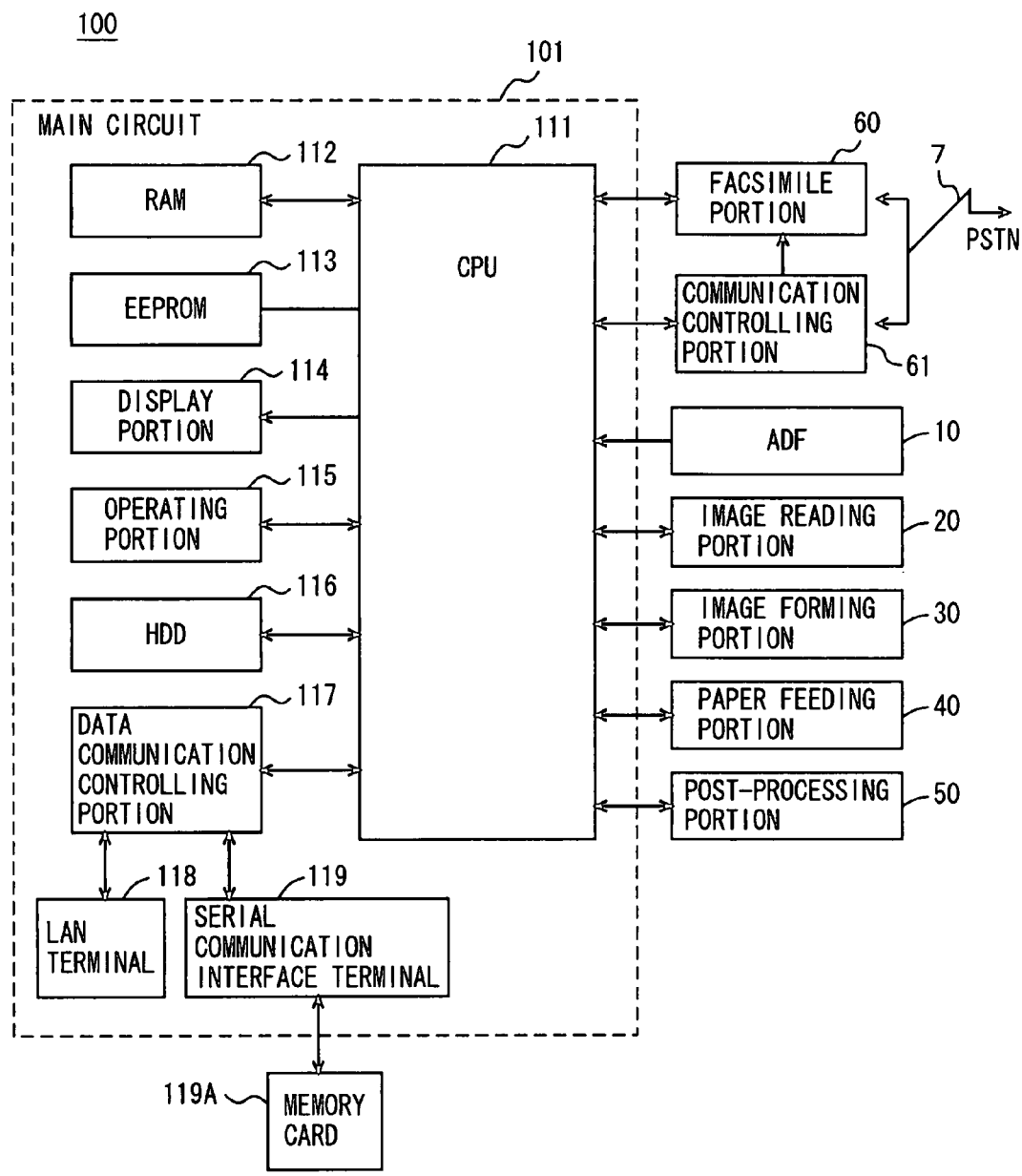
FIG. 3 is a block diagram of the MFP, showing an example of the hardware structure of the MFP.

FIG. 3 is a block diagram of the MFP, showing an example of the hardware structure thereof. Referring to FIG. 3, the MFP 100 includes a main circuit 101, a facsimile portion 60, a communication controlling portion 61, an ADF 10, the text reading portion 20, the image-forming portion 30, the paper feeding portion 40, and the post-processing portion 50. The main circuit 101 includes a central processing unit (CPU) 111, a RAM (Random Access Memory) 112 used as a work area for the CPU 111, an EEPROM (Electronically Erasable and Programmable ROM) 113 for storing programs executed by the CPU 111, a display portion 114, an operating portion 115, a hard disc drive (HDD) 116 serving as a mass storage, and a data communication controlling portion 117. The CPU 111 is connected to the display portion 114, the operation portion 115, the HDD 116, and the data communication controlling portion 117, and controls the main circuit 101 as a whole. The CPU 111 is connected to the facsimile portion 60, the communication controlling portion 61, the ADF 10, the text reading portion 20, the image-forming portion 30, the paper feeding portion 40, and the post-processing portion 50, and controls the MFP 100 as a whole.

The display portion 114 is a display device such as a liquid crystal display (LCD) device and an organic ELD (Electro Luminescence Display), and displays an instruction menu for a user, information concerning acquired image data, and the like. The operating portion 115 has a plurality of keys and receives input of data such as various instructions, characters, and numbers input by the user's operation and corresponding to the keys. The operating portion 115 further includes a touch panel provided on the display portion 114. The display portion 114 and the operating portion 115 constitute the operation panel 9.

The data communication controlling portion 117 includes a LAN terminal 118 serving as an interface for communication according to a communication protocol such as TCP (Transmission Control Protocol) and FTP (File Transfer Protocol), and a serial communication interface terminal 119 for serial communication. According to instructions from the CPU 111, the data communication controlling portion 117 transmits and receives data between external apparatuses connected to the LAN terminal 118 or the serial communication interface terminal 119.

When a LAN cable is connected to the LAN terminal 118 for connection to the network, the data communication controlling portion 117 communicates with an electronic mail server connected thereto via the LAN terminal 118 so that the data communication controlling portion 117 can transmit electronic mails to the electronic mail server.

The CPU 111 controls the data communication controlling portion 117, reads a program for the CPU 111 to execute from a memory card 1119A, and stores the read program in the RAM 112 for execution. The recording medium to store the program for the CPU 111 to execute is not limited to the memory card 119A but can be a flexible disc, a cassette tape, an optical disc (CD-ROM (Compact Disc-ROM), MO (Magnetic Optical Disc), MD (Mini Disc), DVD (Digital Versatile Disc)), an IC card, an optical card, or a semiconductor memory such as a Mask ROM, an EPROM (Erasable Programmable ROM), and an EEPROM (Electronically EPROM). It is also possible that the CPU 111 downloads a program from a computer connected to the Internet and stores the program in the HDD 116, or that a computer connected to the Internet is adapted to write a program onto the HDD 116, and the program stored in the HDD 116 is loaded to the RAM 112 to be executed in the CPU 111. The term program, as used herein, includes a source program, a compressed program, and an encoded program, as well as programs directly executable by the CPU 111.

The communication controlling portion 61 is a modem for connecting the CPU 111 to a PSTN (Public Switched Telephone Networks) 7. To the MFP 100, a telephone number in the PSTN 7 is assigned in advance, and when a facsimile connected to the PSTN 7 makes a call to the telephone number assigned to the MFP 100, the communication controlling portion 61 detects the call. Upon detection of the call, the communication controlling portion 61 establishes a telephone communication and allows the facsimile for it.

The facsimile portion 60 is connected to the PSTN 7 and transmits facsimile data to the PSTN 7 or receives facsimile data from the PSTN 7. The facsimile portion 60 converts received facsimile data into print data printable by the image-forming portion 30 and outputs the print data to the image-forming portion 30. Thus, the image-forming portion 30 prints facsimile data received by the facsimile portion 60 onto a recording sheet. The facsimile portion 60 also converts data stored in the HDD 116 into facsimile data and outputs the data to a facsimile connected to the PSTN 7 or to another MFP. Thus, it is made possible to output data stored in the HDD 116 to a facsimile or another MFP. The MFP 100 thus has the facsimile transmission and receiving function.

FIG. 4 is a diagram showing an example of the hardware structure of the PC 200. Referring to FIG. 4, the PC 200 includes a CPU 201, a RAM 205 used a work area for the CPU 201, a ROM 206 for storing programs executed by the CPU 201, a hard disc drive (HDD) 207, a communication I/F portion 202 for connecting the computer 200 to the network 2, an input portion 204 such as a key board and a mouse, and a monitor 203, respectively connected to a bus 208.

The MFPs 100, 100A, 100B, and 100C have the same behaviors, and therefore the MFP 100 and the PC will be taken as an example here and the behaviors thereof will be described unless stated otherwise. FIG. 5 is a functional schematic diagram showing the functions of the CPUs of the MFP and PC, together with information stored in the HDD.

Referring to FIG. 5, the CPU 201 of the PC 200 includes a data receiving portion 211 to receive data to be processed, a processing condition receiving portion 213 to receive processing executed for the data, a function ticket generating portion 215 to generate a function ticket on the basis of the received processing, a job data generating portion 217 to generate job data for associating the data with the function ticket, an execution instructing portion 219 to transmit an execution instruction, and a job data controlling portion 221 to control the job data.

The data receiving portion 211 receives data to be processed, assigns to the received data a file name (data identification information) for identifying the received data, and stores the received data in the HDD 207. In this manner data 231 is stored in the HDD 207. The data can be generated by executing an application program by the CPU 201, or stored in the HDD 207 in advance. The data includes image data and print data.

The processing condition receiving portion 213 receives processing identification information for identifying the processing executed for the data received by the data receiving portion 211. The processing condition receiving portion 213 outputs the received processing identification information to the function ticket generating portion 215. For example, when, while the CPU 201 is executing an application program, the user inputs into the PC 200 an instruction to identify the processing to be executed for the data generated by the application program, then the PC 200 shows on its display a processing identification screen for receiving input for identifying the processing. The processing here is executed by a function possessed by either one of the MFPs 100, 100A, 100B, and 100C. Examples include file-format conversion processing executed by the function to convert the film format of data, image processing executed by the function to convert a plurality of pages of image data into one page of image data by reduction and synthesis, image processing executed by the function to make image data smooth, transmission processing executed by the data transmission function, and print processing executed by the print function.

When the user identifies the processing according to the processing identification screen, the processing condition receiving portion 213 receives the processing identification information for identifying the identified processing. On the processing identification screen, a plurality of pieces of processing can be identified. In this case, the processing condition receiving portion 213 receives processing identification information for each of the plurality of pieces of identified processing and outputs the pieces of processing identification information to the function ticket generating portion 215. The processing identifiable on the processing identification screen may be executable in at least one of the MFPs 100, 100A, 100B, and 100C. Thus, the PC 200 stores in the HDD 207 or the like in advance the processing identification information of processing executable in at least one of the MFPs 100, 100A, 100B, and 100C.

When the identified processing needs a processing condition for executing the processing, and when the processing condition is input, then the processing condition receiving portion 213 receives the input processing condition and outputs it to the function ticket generating portion 215. Examples of the processing condition include the file format for the file-format conversion processing, the number of pages or resolution for the image processing, transmission destination information for the transmission processing, and the number of sheets to be printed for the print processing. It is also possible in some or all of the plurality of pieces of processing that the processing identification screen identifies apparatuses to execute each of these pieces of processing. In this case, the processing condition receiving portion 213 receives pieces of apparatus identification information for identifying the apparatuses specified as executing the part of the plurality of pieces of processing, and outputs the pieces of apparatus identification information to the function ticket generating portion 215.

It is also possible on the processing identification screen to designate the order for executing the some or all of the plurality of pieces of processing. In this case, the processing condition receiving portion 213 receives the priority for executing the some or all of the plurality of pieces of processing and outputs the priority to the function ticket generating portion 215. The order includes an instruction to execute a piece of processing at the end.

The function ticket generating portion 215, upon input of the processing identification information, generates a function ticket on the basis of the processing identification information, assigns thereto an function ticket number (ticket identification information) for identifying the processing identification information, and stores the function ticket in the HDD 207. Thus, the HDD 207 stores a function ticket 233. The function ticket 233 is definition data for identifying state information denoting the state of the processing identified by each processing identification information. In this embodiment, the function ticket 233 is made up of XML (Extensible Markup Language) data. FIG. 6 shows an example of the function ticket.

Referring to FIG. 6, the function ticket includes the function ticket number for identifying the function ticket and four pieces of processing information. The function ticket number is defined between the tags <Ticket No> and </Ticket No>, in this example, "1." The processing information is defined between the tags <Function> and </Function>. The processing information includes at least the processing identification information and the state information. The processing identification information is defined between the tags <Function> and </Function>. In FIG. 6, the first processing information is defined as "OCR" for identifying the processing for character recognition, the second processing is defined as "RIP" for identifying the file-format conversion processing, the third processing is defined as "N-up" for identifying the image processing executed by the function to convert a plurality of pages of image data into one page of image data by reduction and synthesis, and the fourth processing is defined as "Print" for identifying the image-forming processing.

The state information is defined between the tags <Status> and </Status>. The state information here includes "Open" denoting the state in which processing is yet to be executed, "Processing" denoting state in which processing is under execution, and "Close" denoting the state in which processing is completed.

When a processing condition for processing identification information is input, the processing information including the processing identification information includes the processing condition. The processing condition is defined between the tags <Parameter> and . When apparatus identification information for processing identification information is input, the processing information including the processing identification information includes the apparatus identification information. The apparatus identification information is defined between the tags <Device> and </Device>. When priority for processing identification information is input, the processing information including the processing identification information includes the priority. The priority is defined between the tags <Priority> and </Priority>. The priority is such that smaller numbers indicate higher priority, and the processing with "Last" is executed at the end.

FIG. 7 is a diagram showing an example of processing information generated when the apparatus to execute the last processing is identified. Referring to FIG. 7, when the user designates the apparatus identification information "MFP-A" and specifies the processing for print output, such processing information is generated that the processing identification information is set to "Print," the apparatus identification information denoting the apparatus to execute the processing is set to "MFP-A," and the priority is set to "Last." Since the image-forming processing is executed at the end of a plurality of pieces of processing, the priority is automatically set to "Last." When the user designates the apparatus identification information "MFP-A," specifies the file transfer processing, and designates, as a processing condition, the apparatus identification information "MFP-B" for the transfer destination apparatus, then such processing information is generated that the processing identification information is set to "Download," the apparatus identification information is set to "MFP-A," the priority is set to "Last," and the processing condition is set to "MFP-B." Since the file transfer processing is executed at the end of a plurality of pieces of processing, the priority is automatically set to "Last." While the case where the priority is automatically set to "Last" has been taken as an example, it is possible for the user to designate processing whose priority becomes "Last."

Referring back to FIG. 5, the job data generating portion 217 generates job data associating the data 231 and the function ticket 233, which are stored in the HDD 207, and assigns to the job data a job number (job identification information) for identifying the job data, and stores the job data in the HDD 207 while outputting the job number to the execution instructing portion 219. In this manner job data 235 is stored in the HDD 207. The job data 235 includes at least a file name (data identification information) and a function ticket number (ticket identification information). It is also possible to adapt the job data 235 to include access information used for restricting access to the data 231. When the data receiving portion 211 receives a plurality of kinds of data and the processing condition receiving portion 213 receives a plurality of pieces of processing identification information and processing conditions corresponding to the plurality of kinds of data, then the job data generating portion 217 generates a plurality of kinds of job data corresponding to the plurality of kinds of data. The HDD 207 stores the job data 235 in a job processing queue.

FIG. 8 is a diagram showing an example of the job data stored in the job processing queue. Referring to FIG. 8, the job data defines the job number, access information, function ticket number, and file name. The job number is job identification information for identifying job data. The function ticket number is ticket identification information for identifying the function ticket 233. The file name is data identification information for identifying the data 231. The ticket identification information may be the file name of the function ticket 233. Thus, the job data is data associating the function ticket 233 with the data 231. The access information is information used for restricting access to the data 231 and includes Status and apparatus identification information. "Status" includes "Open" denoting the state in which any of the MFPs 100, 100A, 100B, and 100C is allowed access to the data 231, and "Checkout" denoting the state in which either one of the MFPs 100, 100A, 100B, and 100C is allowed access to the data 231. The apparatus identification information included in the access information is used when Status denotes "Checkout," and defines the apparatus that is allowed access to the data 231. For example, in the job data with the job number "2," only the MFP 100, which is identified by the apparatus identification information "MFP-A," is allowed access to the data with the file name "1002.pdf," with the other MFPs 100A, 100B, and 100C denied access to the data with the file name "1002.pdf." It is noted that the apparatus identification information of the MFPs 100, 100A, 100B, and 100C are respectively denoted as "MFP-A,""MFP-B,""MFP-C," and "MFP-D."

Referring back to FIG. 5, when a job number is input from the job data generating portion 217, the execution instructing portion 219 transmits to each of the MFPs 100, 100A, 100B, and 100C execution instruction information including the file name and the job number and the function ticket number that are included in the job data 235 and identified by the job number. The PC 200 in advance stores in the HDD 207 positional information, in this example the IP (Internet Protocol) address, of each of the MFPs 100, 100A, 100B, and 100C in the network 2, and the execution instructing portion 219 transmits the execution instruction information to the IP addresses. Thus, the MFPs 100, 100A, 100B, and 100C receive the same execution instruction information. The MFPs 100, 100A, 100B, and 100C have the same behaviors, and therefore the MFP 100 will be taken as an example here.

The job data controlling portion 221 controls access to the job data 235. The job data controlling portion 221, upon receiving a lock demand for the job data 235 from one of the MFPs 100, 100A, 100B, and 100C, prohibits the other apparatuses than the one transmitting the lock demand from rewriting the job data 235 until the job data controlling portion 221 receives a release demand from the apparatus transmitting the lock demand. The job data controlling portion 221 allows the apparatus transmitting the lock demand to rewrite the job data 235 from the time of receiving the lock demand until the time of receiving the release demand from the apparatus transmitting the lock demand. This prevents a single set of job data 235 from being simultaneously rewritten by the plurality of MFPs 100, 100A, 100B, and 100C, thereby enabling the plurality of MFPs 100, 100A, 100B, and 100C to reliably execute processing defined by the function ticket 233 for a single piece of data 231.

The CPU 111 of the MFP 100 includes an execution instruction receiving portion 151 to receive an execution instruction, a function ticket acquiring portion 153 to acquire a function ticket, an object processing determining portion 155 to determine object processing to be executed on the basis of the function ticket, a data acquiring portion 157 to acquire data, an object processing executing portion 159 to execute the object processing for the data, a function ticket updating portion 161 to update the function ticket, and a data updating portion 163 to update the data.

When the data communication controlling portion 117 receives an execution instruction from the PC 200 connected to the LAN terminal 118, the execution instruction receiving portion 151 receives from the data communication controlling portion 117 the execution instruction and the IP address of the PC 200, which has transmitted the execution instruction. The IP address is apparatus identification information of the PC 200. The execution instruction receiving portion 151 outputs the job number and file name that are included in the execution instruction and IP address of the PC 200 to the data acquiring portion 157 and the data updating portion 163. The execution instruction receiving portion 151 also outputs the job number, function ticket, and the IP address of the PC 200 to the function ticket acquiring portion 153 and the function ticket updating portion 161.

The function ticket acquiring portion 153 acquires the function ticket from the PC 200. Specifically, the function ticket acquiring portion 153 controls the data communication controlling portion 117 and transmits a function ticket acquisition demand to the IP address input from the execution instruction receiving portion 151. The function ticket acquisition demand includes the function ticket number for identifying the function ticket. The PC 200, upon receiving the function ticket acquisition demand, transmits to the MFP 100 the function ticket 233 identified by the function ticket included in the function ticket acquisition demand. When the data communication controlling portion 117 of the MFP 100 receives the function ticket 233 transmitted from the PC 200, the function ticket acquiring portion 153 receives the function ticket 233 from the data communication controlling portion 117. The function ticket acquiring portion 153 outputs the acquired function ticket 233 to the object processing determining portion 155. It is possible that the function ticket number is the URL (Uniform Resource Locator) of the function ticket 233 so that a function ticket acquisition demand including the URL is transmitted.

On the basis of the processing information of the function ticket 233 input from the function ticket acquiring portion 153, the object processing determining portion 155 determines object processing in reference to capability information 171 stored in the HDD 116. Specifically, the object processing determining portion 155 extracts, among processing identification information included in the processing information, the processing identification information of processing that is yet to be executed. The processing that is yet to be executed is such processing that the state information in the processing information does not denote "Close," in other words, the state information in the processing information denotes "Open" or "Processing." Such processing is processing of which any of the MFPs 100, 100A, 100B, and 100C has not started executing, or processing of which any one of the MFPs 100, 100A, 100B, and 100C has started execution but not completed the execution. Since processing whose execution is completed need not be executed again, processing whose state information denotes "Close" is not extracted.

Next, the object processing determining portion 155 extracts, among the extracted processing identification information of processing that is yet to be executed, the processing information of processing that is executable by the MFP 100. The MFP 100 executable processing, which is identified by the yet-to-be executed processing identification information, which is extracted from the processing information defined by the function ticket 233, will be referred to as candidate processing. The processing identification information of the MFP 100 executable processing is defined in the capability information 171 stored in the HDD 116. Thus, among the extracted processing identification information of processing that is yet to be executed, processing identification information identical to the processing identification information defined by the capability information 171 is the processing identification information of the processing that is executable by the MFP 100.

FIG. 9 is a diagram showing an example of the capability information. The capability information defines one piece of executable processing information between the tags <Function> and </Function>. The capability information 171 shown in FIG. 9 defines three pieces of executable processing information. The executable processing information defines the processing identification information of one piece of executable processing between the tags <Function> and </Function>, and defines one parameter (processing condition) between the tags <Parameter> and . The first executable processing information defines three parameters, "Type 1,""Type 2," and "Type 3," for the processing identification information "OCR" for identifying the image processing of character recognition.

Referring back to FIG. 5, when there are a plurality of pieces of extracted candidate processing, and when the priority is set in the processing information, then the object processing determining portion 155 determines one piece of processing having the highest priority as object processing. When there is no processing for which the priority is not set in the processing information, the object processing determining portion 155 arbitrarily determines one piece of processing as object processing among the plurality of pieces of candidate processing. Further, when the processing information of the extracted candidate processing includes apparatus identification information, which means that the candidate processing is apparatus designating processing designating the apparatus to execute the processing, then the object processing determining portion 155 determines the candidate processing as object processing on condition that the designated apparatus is the object processing determining portion's own apparatus. When the apparatus identification information included in the processing information agrees to the apparatus identification information of the object processing determining portion's own apparatus, the designated apparatus is determined as the object processing determining portion's own apparatus. In the case of determining one piece of processing having the highest priority as object processing, when the object processing is apparatus designating processing, and the designated apparatus is not the object processing determining portion's own apparatus, then the object processing determining portion 155 determines the candidate processing having the next highest priority as object processing. The object processing determining portion 155 outputs the processing identification information of the object processing to the object processing executing portion 159 and the function ticket updating portion 161. When in the function ticket 233 the processing information of the object processing includes a processing condition, the processing condition is output to the object processing executing portion 159 together with the processing information of the object processing.

The data acquiring portion 157 acquires the date 231 from the PC 200. Specifically, the data acquiring portion 157 controls the data communication controlling portion 117 and transmits a data acquisition demand to the IP address input from the execution instruction receiving portion 151. The data acquisition demand includes the file name for identifying the data 231. The PC 200, upon receiving the data acquisition demand, transmits to the MFP 100 the data 231 identified by the file name included in the data acquisition demand. When the data communication controlling portion 117 of the MFP 100 receives the data 231 transmitted from the PC 200, the data acquiring portion 157 receives the data 231 from the data communication controlling portion 117. The data acquiring portion 157 outputs the acquired data 231 to the object processing executing portion 159. It is possible to include in the execution instruction the URL (Uniform Resource Locator) of the data 231 in place of the file name thereof so that a data acquisition demand including the URL is transmitted.

Into the object processing executing portion 159, the processing identification information is input from the object processing determining portion 155, and the data 231 is input from the data acquiring portion 157. The object processing executing portion 159 executes processing identified by the processing identification information for the data. Since, when the processing information of the object processing determined by the object processing determining portion 155 includes a processing condition, the processing condition is input from the object processing determining portion 155 together with the processing identification information, the object processing executing portion 159 executes the processing identified by the processing identification information for the data 231 according to the processing condition. When completing execution of the processing, the object processing executing portion 159 outputs a signal denoting the completion to the function ticket updating portion 161. When the processing identified by the processing identification information is data processing, the object processing executing portion 159 outputs processed data to the data updating portion 163.

Into the function ticket updating portion 161, the IP address of the PC 200 and the function ticket number are input from the execution instruction receiving portion 151, and the processing identification information is input from the object processing determining portion 155. The function ticket updating portion 161 updates the function ticket 233 upon input of the signal denoting the completion of the processing from the object processing executing portion 159. Specifically, the function ticket updating portion 161 controls the data communication controlling portion 117 and transmits a function ticket update demand for updating the function ticket 233 to the IP address input from the execution instruction receiving portion 151. The function ticket update demand includes the function ticket number and the processing identification information. The PC 200, upon receiving the function ticket update demand, specifies the function ticket 233 identified by the function ticket number included in the function ticket update demand. The PC 200 then rewrites to "Close" for the state information of the processing information identified by the processing identification information included in the function ticket 233.

Into the data updating portion 163, the IP address of the PC 200 and the file name are input from the execution instruction receiving portion 151, and processed data is input from the object processing executing portion 159. The data updating portion 163 updates the data 231 upon input of the processed data from the object processing executing portion 159. Specifically, the data updating portion 163 controls the data communication controlling portion 117 and transmits a data update demand for updating the data 231 to the IP address input from the execution instruction receiving portion 151. The data update demand includes the file name and the processed data. The PC 200, upon receiving the data update demand, specifies the data 231 identified by the file name (data identification information) included in the data update demand. The PC 200 then rewrites the data 231 with the processed data.

Since the data 231, which is stored in the HDD 207 of the PC 200, receives access from the MFP 100, 100A, 100B, and 100C, there are cases where any of the other MFPS 100A, 100B, and 100C updates the data 231 before the object processing determining portion 155 of the MFP 100 determines object processing and the data acquiring portion 157 acquires the data 231. When any of the other MFPS 100A, 100B, and 100C executes object processing for the data 231 and updates the data 231, then the MFP 100 need not execute the object processing for the updated data again. In this case, it is therefore necessary that the data acquiring portion 157 of the MFP 100 does not acquire the data 231. There are also cases where any of the other MFPS 100A, 100B, and 100C updates the data 231 before the object processing determining portion 155 of the MFP 100 determines object processing and the data updating portion 163 updates the data 231. Also in this case, it is necessary that the data updating portion 163 of the MFP 100 does not update the data 231. The MFP 100 in this embodiment determines whether the data 231 is acquired or whether the data 231 is updated using the access information of the job data 235 and the state information of the processing information defined by the function ticket 233.

Specifically, the data acquiring portion 157 and the data updating portion 163 each transmit a transmission demand (hereinafter referred to as job data transmission demand) for the job data 235 to the PC 200 before the data acquiring portion 157 acquires the data 231 and the data updating portion 163 updates the data 231. The job data transmission demand includes a job number. The PC 200, upon receiving the job data transmission demand from the MFP 100, reads out a job data 235 including the job number included in the job data transmission demand, and transmits the data job 235 to the MFP 100. The data acquiring portion 157 and the data updating portion 163 each transmit to the PC 200 a function ticket transmission demand for demanding transmission of the function ticket 233 on condition that Status of the access information included in the received job data 235 is "Open," and acquire the function ticket 233. When Status of the access information included in the received job data 235 is not "Open" but "Checkout," the data acquiring portion 157 and the data updating portion 163 each transmit a job data transmission demand to the PC 200 until a job data 235 whose Status of the access information is "Open" is received. This is because when Status of the access information is "Checkout," it is likely that one of the other MFPs 100A, 100B, and 100C has updated the data 231.

Before transmitting the job data transmission demand to the PC 200, the data acquiring portion 157 and the data updating portion 163 each transmit to the PC 200 a restricted state set demand for setting the access information to a restricted state. The restricted state set demand includes a job number. The PC 200, upon receiving the restricted state set demand, changes Status of the access information of a job data 235 including the job number included in the restricted state set demand to "Checkout," and writes onto the apparatus identification information the apparatus that has transmitted the restricted state set demand, in this embodiment, the apparatus identification information "MFP-A" of the MFP 100. By restricting access to the data 231 only to the MFP 100, the other MFPs 100A, 100B, and 100C are prevented from updating the data 231 before the MFP 100 acquires the data 231 after acquiring the job data 235, or before the MFP 100 updates the data 231 after acquiring the job data 235.

The data acquiring portion 157 or the data updating portion 163 judges whether the data 231 has been updated by any of the other MFPs 100A, 100B, and 100C on the basis of the acquired function ticket 233, after changing Status of the access information of the job data 235 to "Checkout" and changing the apparatus identification information to "MFP-A." This is because after Status of the access information of the job data 235 is changed to "Checkout" and the apparatus identification information is changed to "MFP-A," all the other MFPs 100A, 100B, and 100C are denied access to the data 231, making it impossible to update the data 231.

The data acquiring portion 157 or the data updating portion 163 refers to the state information of, among processing information of the acquired function ticket 233, processing information including the processing identification information of the object processing. When the state information is "Close," the data acquiring portion 157 or the data updating portion 163 judges that the data 231 has been updated by one of the other MFPs 100A, 100B, and 100C, and when the state information is not "Close," judges that the data 231 is yet to be updated.

Further, the data acquiring portion 157 or the data updating portion 163, in order to prevent the other MFPs 100A, 100B, and 100C from updating the job data 235 during the time between acquisition of the job data 235 and change in Status of the access information of the job data 235 to "Checkout" and change in the apparatus identification information to "MFP-A," transmits to the PC 200 a lock demand for demanding prohibition of change in the job data 235 by any of the other MFPs 100A, 100B, and 100C before acquiring the job data 235. Further, the data acquiring portion 157 or the data updating portion 163 transmits a lock release demand for demanding release of the change prohibition of the job data 235 after transmitting the lock demand, acquiring the job data 235 and changing Status of the access information of the job data 235 to "Checkout," and changing the apparatus identification information to "MFP-A." This is for the purpose of allowing the other MFPs 100A, 100B, and 100C to change the job data 235.

Figure 10:
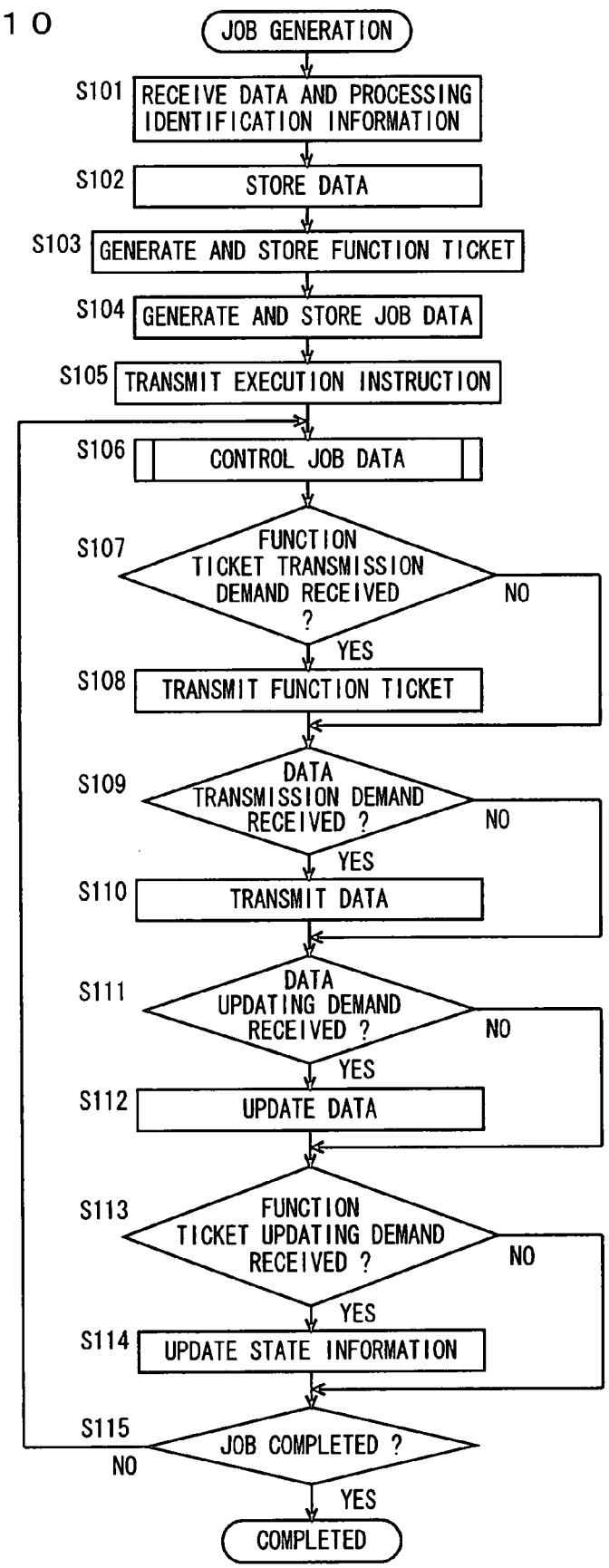
FIG. 10 is a flowchart showing an example of the flow of job generating processing executed in the PC.

FIG. 10 is a flowchart showing an example of the flow of job generating processing executed in the PC. The job generating processing is executed by the CPU 201 of the PC 200 by executing a job generating program. Referring to FIG. 10, the CPU 201 receives data to be processed and processing identification information for identifying processing to be executed for the data (step S101). When the user inputs a data designation and the processing identification information using the input portion 204 such as the keyboard and mouse, the CPU 201 receives the data designation and the processing identification information from the input portion 204. When the CPU 201 executes an application program, and the user inputs a print instruction using the input portion 204, data generated from the application program is designated, and a processing specification screen for setting print conditions is displayed on the monitor 203. When the user inputs, using the input portion 204, an instruction for selecting data stored in the HDD 207, the selected data is designated and a processing specification screen for setting print conditions is displayed on the monitor 203. When the user inputs, using the input portion 204, an instruction for specifying processing according to the processing specification screen, the CPU 201 receives processing identification information for identifying the specified processing. On the processing specification screen, a plurality of pieces of processing can be specified, and when a plurality of pieces of processing are specified, the CPU 201 receives processing identification information for each of the plurality of pieces of processing.

The CPU 201 then assigns to the received data a file name (data identification information) for identifying the received data, and stores the data in the HDD 207 (step S102). In this manner the data 231 is stored in the HDD 207. When the data 231 is stored in the HDD 207 in advance, the file name is already assigned and therefore step S102 need not be executed. When a processing condition is required for executing the specified processing, and the processing condition is input from the input portion 204, then the CPU 201 receives the input processing condition. Further, when priority for a part of the plurality of pieces of processing is input from the input portion 204, the CPU 201 receives the priority.

The CPU 201 then generates a function ticket on the basis of the processing identification information received in step S101, and assigns to the function ticket a function ticket number (ticket identification information) for identifying the function ticket, and stores the function ticket in the HDD 207 (step S103). In this manner the function ticket 233 is stored in the HDD 207. Here the example where the function ticket shown in FIG. 6 is generated will be described. The function ticket 233 includes the function ticket number for identifying the function ticket and four pieces of processing information. The processing information includes at least the processing identification information and the state information. The processing identification information is information for identifying processing. The state information denotes the state of processing identified by the processing identification information including "Open" denoting the yet-to-be executed state of the processing, "Processing" denoting that the processing is under execution, or "Close" denoting the completion of the processing. When a processing condition is required for the processing identified by the processing identification information, the processing condition is received in step S101 and therefore the processing information includes the processing condition. When an apparatus to execute the processing identified by the processing identification information is identified, the apparatus identification information of the apparatus is received in step S101, and therefore the processing information includes the apparatus identification information. Further, when priority corresponding to a part of a plurality of pieces of processing is input, the priority is received in step S101 and therefore the processing information includes the priority.

The CPU 201 then generates job data for associating the data 231, stored in the HDD 207, with the function ticket 233, assigns a job number (job identification information) to the job data, and stores the job data in the HDD 207 (step S104). In this manner the job data 235 is stored in the HDD 207. The job data 235 includes the file name (data identification information), the function ticket number (ticket identification information), and access information for restricting access to the data 231.

In step S105, the CPU 201 transmits to each of the MFPs 100, 100A, 100B, and 100C an execution instruction including the job number of the job data 235 generated in step S104, the file name of the data 231 received in step S101, and the function ticket number of the function ticket 233 generated in step S103. The MFPs 100, 100A, 100B, and 100C each receive the execution instruction. Execution of processing by the MFPs 100, 100A, 100B, and 100C in response to the execution instruction will be described later.

In step S106, the CPU 201 executes job data control processing. While the details of the job data control processing will be described later, the job data control processing is for controlling access to the job data 235. The job data control processing switches between the locked state in which either one of the MFPs 100, 100, 100B, and 100C is allowed access to the job data 235 and the lock released state in which all the MFPs 100, 100A, 100B, and 100C are allowed access to the job data 235. By allowing only one of the MFPs 100, 100A, 100B, and 100C to change the job data 235 on the basis of an instruction from the one MFP, the job data 235 is prevented from being changed simultaneously by a plurality of MFPs among the MFPs 100, 100A, 100B, and 100C. For example, in the locked state in which only the MFP 100 is allowed to change the job data 235, the other MFPs 100A, 100B, and 100C cannot change the job data 235. Thus, the MFP 100 is able to acquire and change the job data 235 in the locked state.

In the next step S107, the CPU 201 judges whether a function ticket transmission demand is received. When the function ticket transmission demand is received, the processing proceeds to step S108, and otherwise, the processing skips step S108 and proceeds to step S109. In step S108, the CPU 201 reads out from the HDD 207 a function ticket 233 identified by the function ticket number included in the received function ticket transmission demand, and transmits the read out function ticket 233 to the apparatus that has transmitted the function ticket transmission demand.

In the next step S109, the CPU 201 judges whether a data transmission demand is received. When the data transmission demand is received, the processing proceeds to step S110, and otherwise, the processing skips step S110 and proceeds to step S111. In step S110, the CPU 201 reads out from the HDD 207 data 231 identified by the file name included in the received data transmission demand, and transmits the read out data 231 to the apparatus that has transmitted the data transmission demand.

In the next step S111, the CPU 201 judges whether a function ticket update demand is received. When the function ticket update demand is received, the processing proceeds to step S112, and otherwise, the processing skips step S112 and proceeds to step S113. In step S112, the CPU 201 updates the data 231 identified by the file name included in the received data update demand with the processed data included in the data update demand.

In the next step S113, the CPU 201 judges whether a function ticket update demand is received. When the function ticket update demand is received, the processing proceeds to step S114, and otherwise, the processing skips step S104 and proceeds to step S115. The function ticket update demand includes a function ticket number for identifying the function ticket, processing identification information, and state information. In step S114, for a function ticket 233 identified by the function ticket number included in the received function ticket update demand, the CPU 201 rewrites the state information of the processing information identified by the processing identification information included in the received function ticket update demand with state information (Processing or Close) included in the received function ticket update demand.

In the next step S115, the CPU 201 judges whether the job is completed. Specifically, the CPU 201 judges whether Status of all the processing information defined by the function ticket 233 generated in step S103 is "Close." When Status of all the processing information is "Close," the processing is terminated, and otherwise, the processing goes back to step S106. The processing is also terminated when the CPU 201 receives a job completion notification from the MFP, among the MFPs 100, 100A, 100B, and 100C, that has executed the last processing. It is possible that before the processing is completed, the user of the PC 200 is notified of the completion of the job by displaying on the monitor 203 of the PC 200 denoting that the job has been completed. Further, when the CPU 201 receives the job completion notification, the apparatus identification information of the apparatus that has transmitted the job completion notification can be displayed thereby notifying the user about the apparatus to execute the last processing. For example, when the last processing is image forming processing, the user can be notified which of the plurality of MFPs 100, 100A, 100B, and 100C an image-formed sheet of paper is output to.

Also, the PC 200 can be adapted to store every execution by the MFPs 100, 100A, 100B, and 100C of each processing defined by the function ticket 233 thereby storing execution histories. This enables it to display the order of execution of each processing, the apparatus to execute each processing, the time required for each processing, and the like. It is also possible to calculate the cost spent on execution of a job on the basis of the history data and display the calculated cost.

Figure 11:
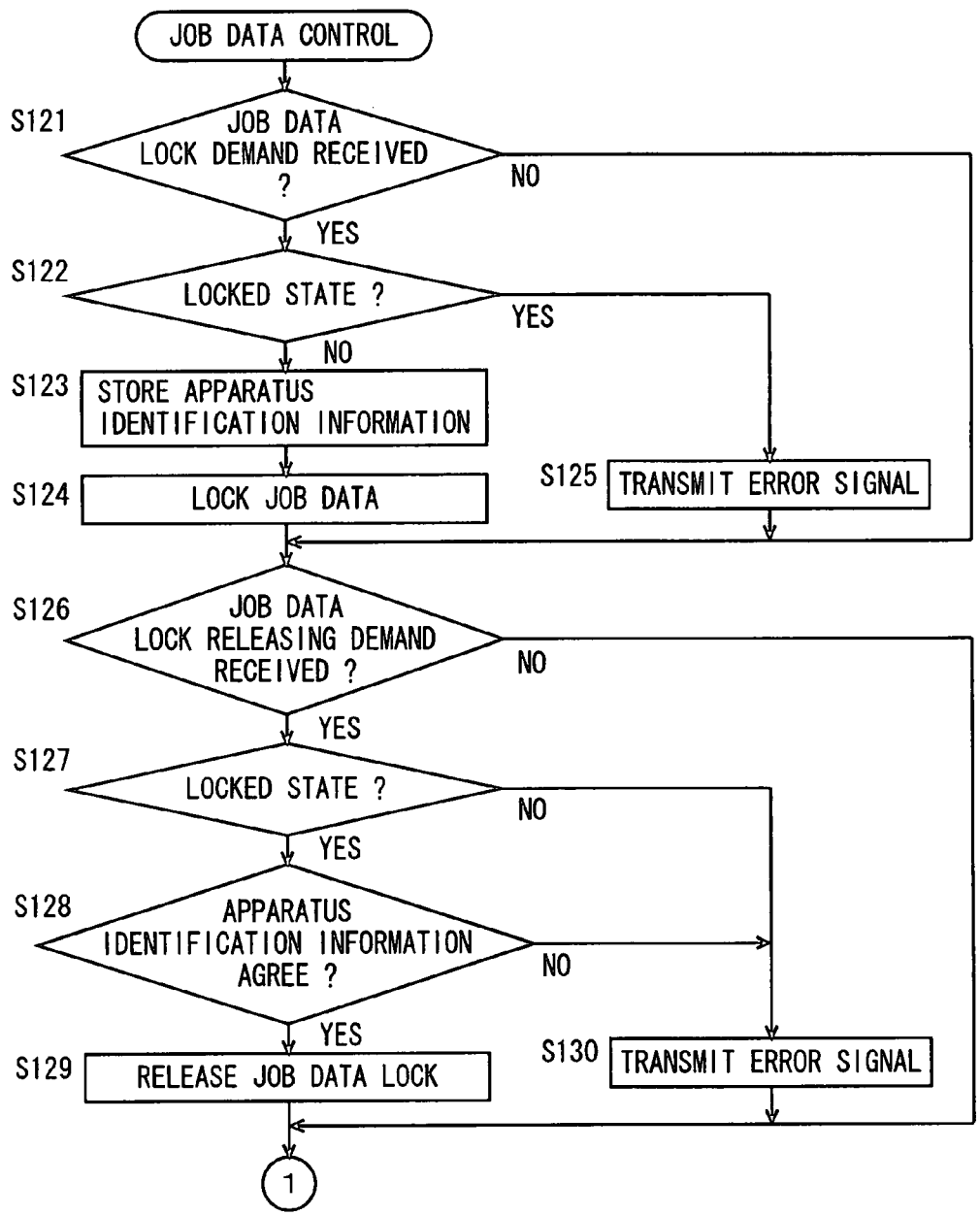
FIG. 11 is a first flowchart showing an example of the flow of job data controlling processing.
Figure 12:
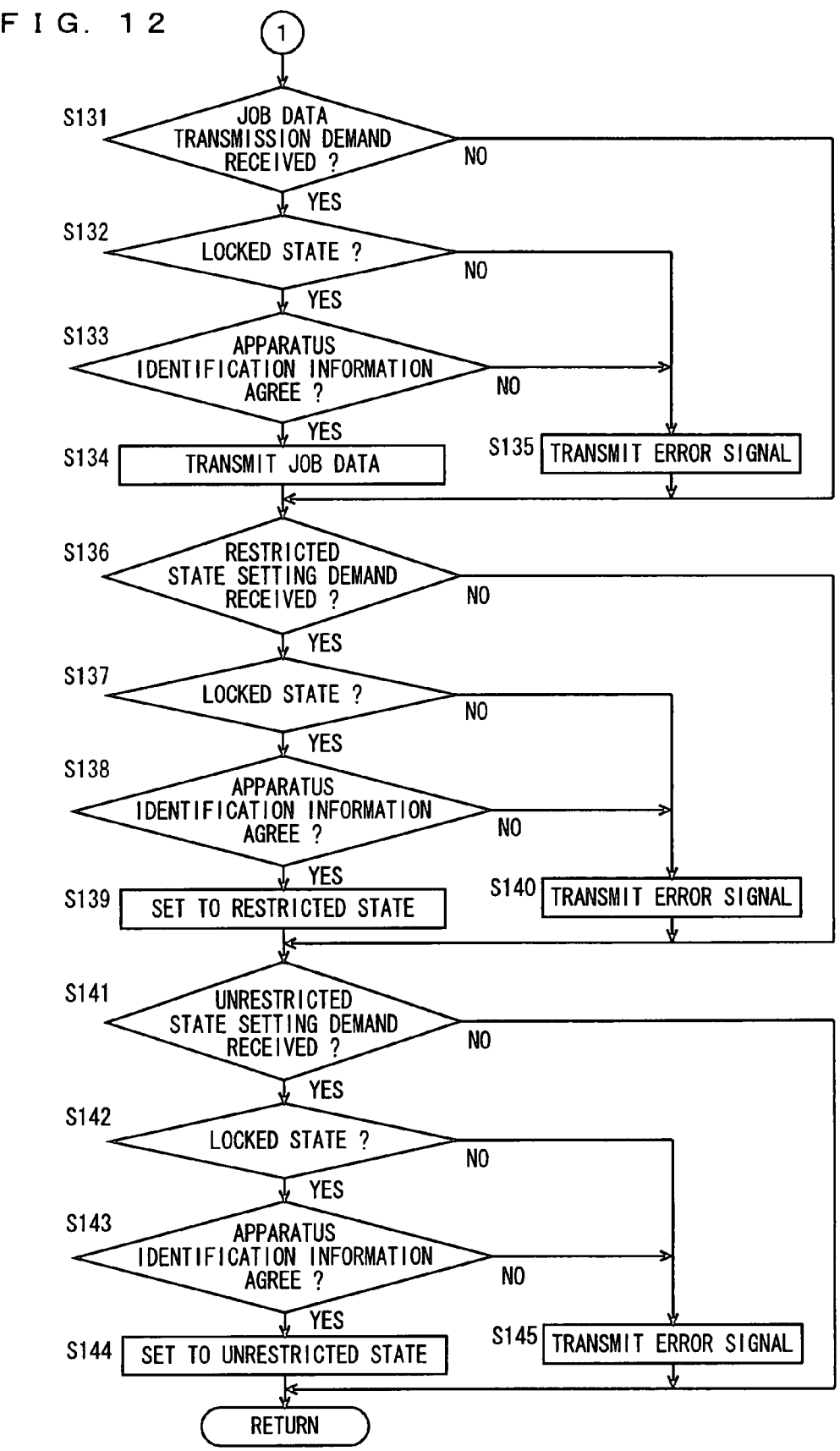
FIG. 12 is a second flowchart showing an example of the flow of job data controlling processing.

FIGS. 11 and 12 are flowcharts showing examples of the flow of job data controlling processing. The job data controlling processing is executed in step S106 shown in FIG. 10. Referring to FIGS. 11 and 12, the CPU 201 of the PC 200 judges whether a lock demand for job data is received (step S121). When the lock demand is received, the processing proceeds to step S122, and otherwise, the processing proceeds to step S126. In step S122, the CPU 201 judges whether job data 235 identified by the job number included in the received lock demand is in the locked state. When the job data 235 is in the locked state, the processing proceeds to step S125, and when the job data 235 is in the lock released state instead of the locked state, the processing proceeds to step S123. In step S125, the CPU 201 transmits an error signal to the apparatus that has transmitted the lock demand. This is for the purpose of prohibiting access to the job data 235 in the locked state.

In step S123, the CPU 201 temporarily stores the apparatus identification information of the apparatus that has transmitted the lock demand in the RAM 205, and the processing proceeds to step S124. In step S124, the CPU 201 changes the lock released state of the job data 235 to the locked state.

In step S126, the CPU 201 judges whether the lock release demand for job data 235 is received. When the lock release demand is received, the processing proceeds to step S127, and otherwise, the processing proceeds to step S131. In step S127, the CPU 201 judges whether job data 235 identified by the job number included in the received lock demand is in the locked state. When the job data 235 is in the locked state, the processing proceeds to step S128, and when the job data 235 is in the lock released state instead of the locked state, the processing proceeds to step S130. In step S130, the CPU 201 transmits an error signal to the apparatus that has transmitted the lock demand. In step S128, the CPU 201 judges whether the apparatus identification information of the apparatus that has transmitted the lock release demand agrees to the apparatus identification information temporarily stored in the RAM 205 in step S123. When both agree to each other, the processing proceeds to step S129, and when both do not agree to each other, the processing proceeds to step S130. This is for the purpose of allowing only a lock release demand from the apparatus that has rendered the job data 235 the locked state to change the job data 235 to the lock released state. In step S129, the CPU 201 changes the job data 235 from the locked state to the lock released state.

In step S131, the CPU 201 judges whether a job data transmission demand is received. When the job data transmission demand is received, the processing proceeds to step S132, and otherwise, the processing proceeds to step S136. The job data transmission demand includes a job number. In step S132, the CPU 201 judges whether job data 235 identified by the job number included in the received job data transmission demand is in the locked state. When the job data 235 is in the locked state, the processing proceeds to step S133, and when the job data 235 is in the lock released state instead of the locked state, the processing proceeds to step S135. In step S135, the CPU 201 transmits an error signal to the apparatus that has transmitted the job data transmission demand. In step S133, the CPU 201 judges whether the apparatus identification information of the apparatus that has transmitted the job data transmission demand agrees to the apparatus identification information temporarily stored in the RAM 205 in step S123. When both agree to each other, the processing proceeds to step S134, and when both do not agree to each other, the processing proceeds to step 135. This is for the purpose of transmitting the job data 235 only by a job data transmission demand received from the apparatus that has rendered the job data 235 the locked state. In step S134, the CPU 201 reads out the job data 235 from the HDD 207 and transmits the read out job data 235 to the apparatus that has transmitted the job data transmission demand.

In step S136, the CPU 201 judges whether a restricted state set demand for setting the data 231 to the restricted state is received. When the restricted state set demand is received, the processing proceeds to step S137, and otherwise, the processing proceeds to step S141. The restricted state set demand includes a job number. In step S137, the CPU 201 judges whether job data 235 identified by the job number included in the received restricted state set demand is in the locked state. When the job data 235 is in the locked state, the processing proceeds to step S138, and when the job data 235 is in the lock released state instead of the locked state, the processing proceeds to step S140. In step S140, the CPU 201 transmits an error signal to the apparatus that has transmitted the restricted state set demand. In step S138, the CPU 201 judges whether the apparatus identification information of the apparatus that has transmitted the restricted state set demand agrees to the apparatus identification information temporarily stored in the RAM 205 in step S123. When both agree to each other, the processing proceeds to step S139, and when both do not agree to each other, the processing proceeds to step 140. This is for the purpose of allowing change to the restricted state in which access to the data 231 is restricted only by a restricted state set demand received from the apparatus that has rendered the job data 235 the locked state. In step S139, the CPU 201 sets the data 231 to the restricted state in which access to the data 231 is restricted. Specifically, the CPU 201 sets Status of the access information of the job data 235 to "Checkout."

In step S141, the CPU 201 judges whether an unrestricted state set demand for setting the data 231 to the unrestricted state is received. When the unrestricted state set demand is received, the processing proceeds to step S142, and otherwise, the processing goes back to the job generating processing. The unrestricted state set demand includes a job number. In step S142, the CPU 201 judges whether job data 235 identified by the job number included in the received unrestricted state set demand is in the locked state. When the job data 235 is in the locked state, the processing proceeds to step S143, and when the job data 235 is in the lock released state instead of the locked state, the processing proceeds to step S145. In step S145, the CPU 201 transmits an error signal to the apparatus that has transmitted the unrestricted state set demand, and the processing goes back to the job generating processing. In step S143, the CPU 201 judges whether the apparatus identification information of the apparatus that has transmitted the unrestricted state set demand agrees to the apparatus identification information temporarily stored in the RAM 205 in step S123. When both agree to each other, the processing proceeds to step S144, and when both do not agree to each other, the processing proceeds to step 145. This is for the purpose of allowing change to the unrestricted state in which access to the data 231 is not restricted only by an unrestricted state set demand received from the apparatus that has rendered the job data 235 the locked state. In step S144, the CPU 201 sets the data 231 to the unrestricted state in which access to the data 231 is not restricted, and the processing goes back to the job generating processing Specifically, the CPU 201 sets Status of the access information of the job data 235 to "Open."

Figure 13:
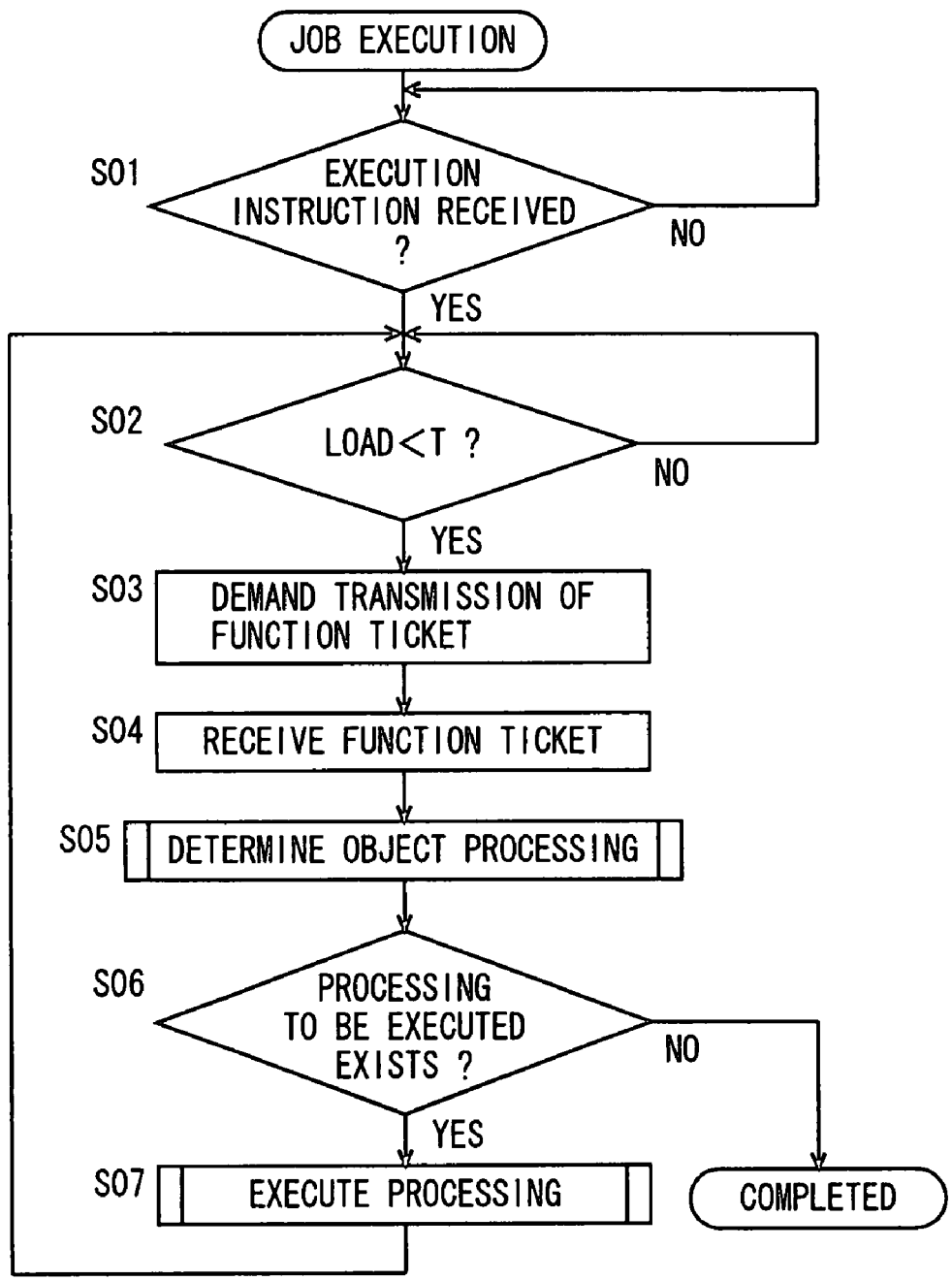
FIG. 13 is a flowchart showing an example of the flow of job executing processing.

FIG. 13 is a flowchart showing an example of the flow of job executing processing. The job executing processing is executed by the CPU 111 of each of the MFPs 100, 100A, 100B, and 100C by executing a job controlling program. Here the example where the CPU 111 of the MFP 100 executes the job executing processing will be described.

Referring to FIG. 13, the CPU 111 judges whether an execution instruction is received from the PC 200 (step S01). The MFP 100 turns into a stand-by state until the execution instruction is received ("NO" in step S01). When the execution instruction is received, the processing proceeds to step S02. In other words, the job executing processing is executed on condition that the execution instruction is received from the PC 200.

In step S02, the CPU 111 judges whether the load of the MFP 100 is less than a predetermined threshold value T. MFP 100 turns into a stand-by state until the load becomes less than the threshold value T ("NO" in step S02). When the load is less than the threshold value T, the processing proceeds to step S03. This is for the purpose of securing that processing is executed according to the execution instruction when the load of the MFP 100 is less than the threshold value T and that the load of the MFP 100 is prevented from becoming more than the threshold value T. Thus, load of execution of processing according to the execution instruction can be distributed among the plurality of MFPs 100, 100A, 100B, and 100C.

In step S03, the CPU 111 demands the PC 200 to transmit a function ticket. Specifically, the CPU 111 transmits a function ticket transmission demand to the PC 200, which has transmitted the execution instruction. The function ticket transmission demand includes a function ticket number included in the execution instruction. As shown in FIG. 10, the PC 200, which executes the job generating processing, transmits the execution instruction to each of the MFPs 100, 100A, 100B, and 100C (step S105). Upon receiving a function ticket transmission demand from either one of the MFPs 100, 100A, 100B, and 100C (step S107), the PC 200 transmits a function ticket 233 to the apparatus that has transmitted the function ticket transmission demand (step S108). Thus, the MFP 100 receives the function ticket 233 from the PC 200 (step S04).

In the next step S05, CPU 111 executes object processing determining processing. While the details of the object processing determining processing will be described later, the object processing determining processing is for determining, on the basis of the function ticket 233, object processing for the MFP 100 to execute. In the next step S06, the CPU 111 judges whether the object processing has been determined as a result of execution of the object processing determining processing. When the object processing is determined, the processing proceeds to step S07, and otherwise the processing is discontinued.

In the next step S07, the CPU 111 executes processing execution processing, and the processing goes back to step S02. While the details of the processing execution processing will be described later, the processing execution processing is for executing the object processing determined in step S05. Thus, in the job executing processing, the CPU 111 sequentially executes, among the processing defined by the function ticket 233, object processing for the MFP 100 to execute until there is no object processing, at which time the processing is discontinued. When, therefore, there is no object processing for the MFPs 100, 100A, 100B, and 100C to execute, execution of all the processing defined by the function ticket 233 is completed.

Figure 14:
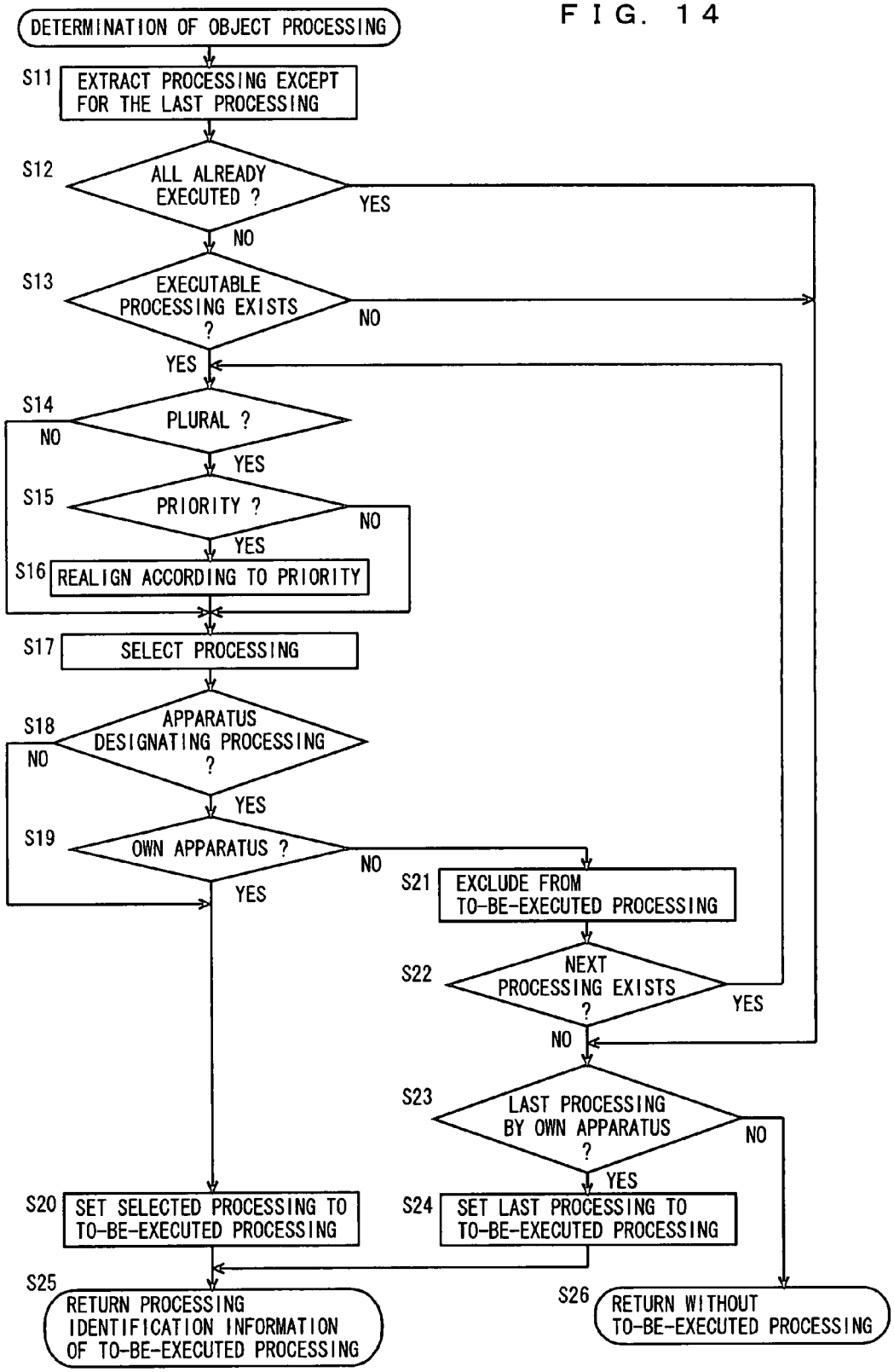
FIG. 14 is a flowchart showing an example of the flow of object processing determining processing.

FIG. 14 is a flowchart showing an example of the flow of object processing determining processing. The object processing determining processing is executed in step S05 shown in FIG. 13. Referring to FIG. 14, the CPU 111 extracts, among the processing defined by the function ticket 233, processing except for the last processing (step S11). The processing except for the last processing is identified by processing identification information of, among the processing information defined by the function ticket 233, processing information whose priority is not "Last."

Next, the CPU 111 judges whether all the extracted processing is already executed (step S12). The already executed processing is identified by processing identification information of, among the processing information defined by the function ticket 233, processing whose state information (Status) is "Close." When all the extracted processing is already executed, the processing proceeds to step S23. When at least one piece of the extracted processing is yet to be executed, the CPU 111 extracts the piece of processing, and the processing proceeds to step S13. The yet-to-be executed processing will be hereinafter referred to as candidate processing. The CPU 111 determines object processing to be executed among the candidate processing.

In step S13, the CPU 111 judges whether there is processing, among the candidate processing, that is executable by the MFP 100. By referring to the capability information 171 stored in the HDD 116, the CPU 111 extracts all executable processing. Specifically, when the processing identification information of a piece of candidate processing agrees to any of the executable processing information defined by the capability information 171, the CPU 111 extracts the piece of candidate processing as executable processing. When at least one piece of candidate processing is extracted, the processing proceeds to step S14, and when no candidate processing is extracted, the processing proceeds to step S23.

In the next step S14, the CPU 111 judges whether a plurality of pieces of executable processing have been extracted. When a plurality of pieces of executable processing have been extracted, the processing proceeds to step S15. When a single piece of executable processing has been extracted, the processing proceeds to step S17. In step S17, the CPU 111 selects the extracted single piece of executable processing, and the processing proceeds to step S18.

In step S15, the CPU 111 judges whether priority is set for any of the plurality of pieces of extracted executable processing. When priority is set for any of the plurality of pieces of extracted executable processing, the plurality of pieces of executable processing are realigned according to the priority (step S16), and the processing proceeds to step S17. In step S17, the CPU 111 selects, among the plurality of pieces of executable processing, a piece of processing having the highest priority, and the processing proceeds to step S18. When no priority is set for any of the plurality of pieces of extracted executable processing, the processing proceeds to step S17. In step S17, the CPU 111 selects, among the plurality of pieces of executable processing, an arbitrary piece of processing, and the processing proceeds to step S18.

In step S18, the CPU 111 judges whether the processing selected in step S17 is apparatus designating processing. The apparatus designating processing is identified by processing identification information of, among the processing information defined by the function ticket 233, processing information including apparatus identification information (Device). When the processing information of the processing selected in step S17 defines apparatus identification information, the processing proceeds to step S19, and otherwise, the processing proceeds to step S20. In step S19, the CPU 111 judges whether the apparatus defined by the apparatus identification information is the CPU's own apparatus. When the apparatus is the CPU's own apparatus, the processing proceeds to step S20. When the apparatus is not the CPU's own apparatus, the processing proceeds to step S21. In step S20, the CPU 111 specifies the processing selected in step S17 as the to-be-executed processing, and the processing proceeds to step S25. In step S25, the CPU 111 sets the processing identification information of the specified to-be-executed processing to be a return value, and the processing goes back to the job executing processing.

In step S21, the CPU 111 excludes the processing selected in step S17 from processing to be executed, and the processing proceeds to step S22. In step S22, the CPU 111 judges whether there is any processing, among the executable processing extracted in step S13, that is left after excluding the processing from processing to be executed in step S21. When there is such processing left, the processing goes back to step S14, and otherwise, the processing proceeds to step S23.

In step S23, the CPU 111 judges whether the CPU's own apparatus is designated for the last processing. The last processing is identified by processing identification information of, among the processing information defined by the function ticket 233, processing information whose priority is set to "Last." When there is no processing information, among the processing information defined by the function ticket 233, whose priority is set to "Last," the processing proceeds to step S26. When there is processing information, among the processing information defined by the function ticket 233, whose priority is set to "Last," and when the apparatus identification information defined by the processing information is the same as the apparatus identification information of the CPU's own apparatus (in this example, MFP 100), then the processing proceeds to step S24. When both apparatus identification information are not the same, the processing proceeds to step S26. In step S24, the CPU 111 sets the last processing to be the to-be-executed processing, and the processing proceeds to step S25. In step S26, the CPU 111 sets "No to-be-executed processing" to a return value, and the processing goes back to the job executing processing.

Figure 15:
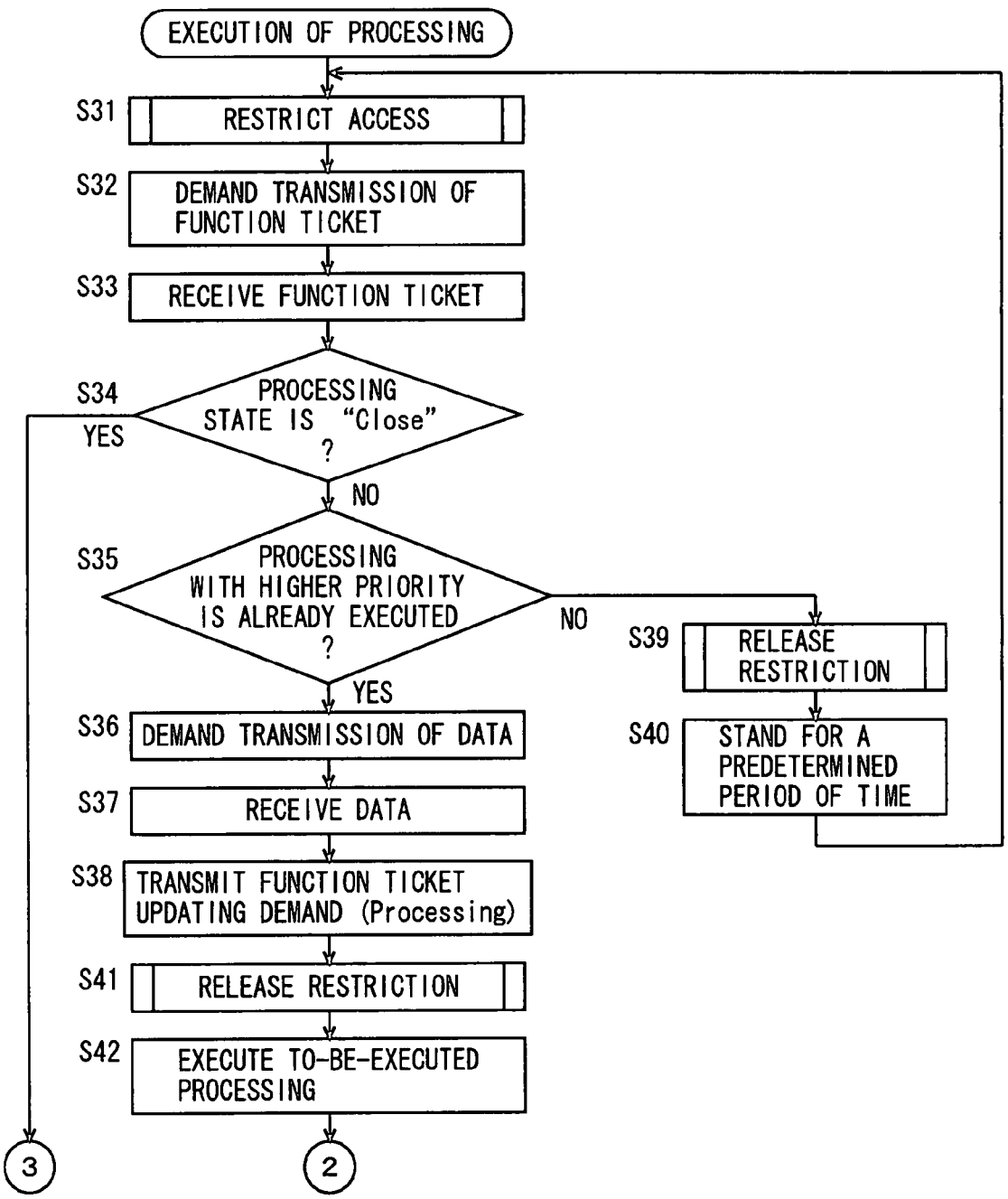
FIG. 15 is a first flowchart showing an example of the flow of processing execution processing.
Figure 16:
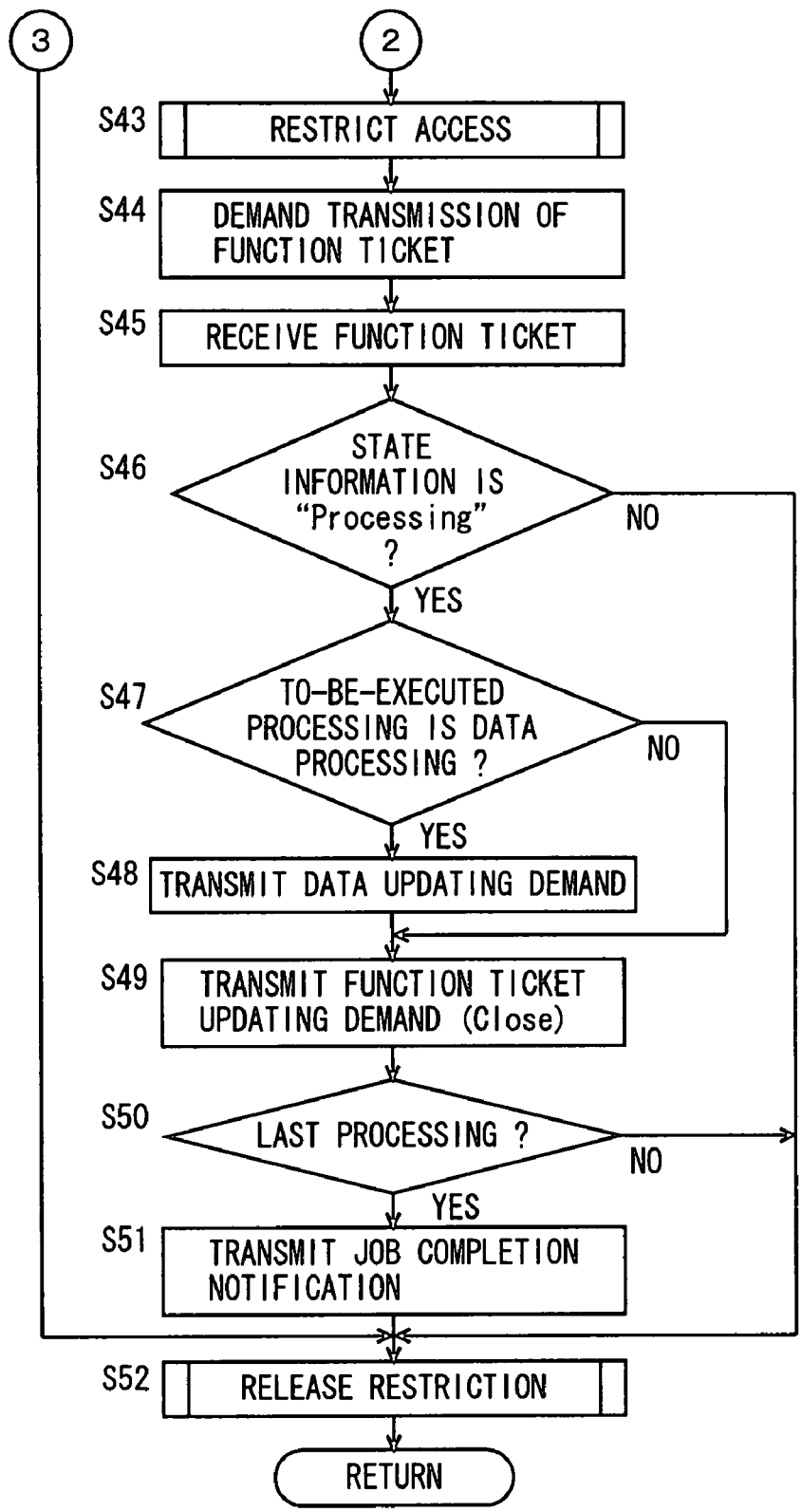
FIG. 16 is a second flowchart showing an example of the flow of processing execution processing.

FIGS. 15 and 16 are flowcharts showing examples of the flow of processing executing processing. The processing executing processing is executed in step S07 shown in FIG. 13. Referring to FIGS. 15 and 16, the CPU 111 executes access restricting processing (step S31). While the details of the access restricting processing will be described later, the access restricting processing is for causing the PC 200 to set the data 231 stored in the HDD 207 of the PC 200 to be a restricted state in which access to the data 231 is restricted to the CPU's own apparatus. This is for the purpose of preventing the data 231 from being updated by any of the other MFPs 100A, 100B, and 100C before the CPU's own apparatus acquires the data 231 after receiving the function ticket.

In the next step S32, the CPU 111 transmits a function ticket transmission demand to the PC 200. The function ticket transmission demand includes a function ticket number. As shown in FIG. 10, upon receiving the function ticket transmission demand (step S107), the PC 200 transmits (step S108) to the MFP 100 a function ticket 233 identified by the function ticket number included in the function ticket transmission demand. The MFP 100 receives the function ticket 233 (step S33).

The CPU 111 then judges whether state information defined by processing information, among the processing information of the received function ticket 233, that includes the processing identification information of the to-be-executed processing that has been determined by object processing determining processing executed first is "Close," which denotes that the processing is completed (step S34). When the state information is "Close," the processing proceeds to step S52. This is because processing that is already executed need not be executed again. When the state information is not "Close," the processing proceeds to step S35.

In step S35, the CPU 111 judges whether processing having higher priority than the to-be-executed processing is already executed. The CPU 111 judges whether the state information is "Close" for every processing information, among the processing information defined by the function ticket 233, whose priority is higher than the priority of the processing information including the processing identification information of the to-be-executed processing. When processing having higher priority than the to-be-executed processing is yet to be executed, the processing proceeds to step S39. This is for the purpose of executing the to-be-executed processing after the processing having higher priority is executed. In step S39, the CPU 111 executes restriction releasing processing. While the details of the restriction releasing processing will be described later, the restriction releasing processing is for releasing the restricted state of the data 231, in which access to the data 231 is restricted, by executing access releasing processing. After an elapse of a predetermined period of time (step S40), the processing goes back to step S31. This is because during a predetermined time period of standing, the processing having higher priority may be executed.

When in step S35 the processing having higher priority is already executed, the processing proceeds to step S36. In step S36, the CPU 111 transmits a data transmission demand to the PC 200. The data transmission demand includes the file name of the data 231. As shown in FIG. 10, upon receiving the data transmission demand (step S109), the PC 200 transmits (step S110) to the MFP 100 data 231 identified by the file name included in the data transmission demand. The MFP 100 receives the data 231 (step S37).

The CPU 111 updates the state information during execution. Specifically, the CPU 111 transmits to the PC 200 a function ticket update demand for updating the state information to "Processing" (step S38). The function ticket update demand includes a function ticket number, processing identification information, and state information (at this stage, "Processing"). As shown in FIG. 10, upon receiving the function ticket update demand (step S113), the PC 200 updates the state information of processing information including the processing identification information of a function ticket 233 identified by the function ticket number included in the function ticket update demand to "Processing" (step S114).

In the next step S41, the CPU 111 executes the restriction releasing processing, and the processing proceeds to step S42. The other MFPs 100A, 100B, and 100C, which acquire the function ticket 233 after the MFP 100 releases the restricted state, in which access to the data 231 is restricted, know on the basis of the state information whether the processing is being executed by the MFP 100.

In step S42, the CPU 111 executes the to-be-executed processing for the data 231. When the processing information, among the processing information defined by the function ticket 233, that includes the processing identification information of the to-be-executed processing includes a processing condition, the to-be-executed processing identified by the processing identification information is executed according to the processing condition.

Upon completion of the to-be-executed processing for the data 231, the CPU 111 executes the access restricting processing (step S43), thereby setting the data 231 to be a restricted state. Similarly to steps S32 and S33, the CPU 111 demands transmission of the function ticket 233 (step S44) and receives the function ticket from the PC 200 (step S45).

The CPU 111 then judges whether the state information is "Processing" in the processing information, among the processing information defined by the received function ticket 233, that includes the processing identification information of the to-be-executed processing (step S46). When the state information is "Processing," the processing proceeds to step S47. This is for the purpose of executing the step S47 and steps thereafter when, after the state information is changed to "Processing" by executing the processing in step S38, the state information is not changed by any of the other MFPs 100A, 100B, 100C. When the state information is not "Processing," the processing proceeds to step S52. This is because when the state information is not "Processing," the state information is changed to "Close" by any of the other MFPs 100A, 100B, 100C, in which case the data need not be updated.

In step S47, the CPU 111 judges whether the kind of the to-be-executed processing is data processing. The data processing refers to the processing of outputting the data 231 after being processed. For example, the data processing includes image processing. Processing that is not data processing includes outputting processing such as image-forming processing, display processing, and data transfer processing. When the to-be-executed processing is data processing, the processing proceeds to step S48, and otherwise, the processing skips step S48 and proceeds to step S49.

In step S48, the CPU 111 transmits a data update demand to the PC 200. The data update demand includes the file name of the data 231 and processed data for which the to-be-executed processing is executed in step S42. As shown in FIG. 10, upon receiving the data update demand (step S111), the PC 200 updates data 231 identified by the file name included in the data update demand with the processed data (step S112).

In step S49, the CPU 111 updates the state information to a processed state. Specifically, the CPU 111 transmits to the PC 200 a function ticket update demand for changing the state information to "Close." The function ticket update demand includes a function ticket number, processing identification information, and state information (at this stage, "Close"). As shown in FIG. 10, upon receiving the function ticket update demand (step S113), the PC 200 updates the state information of the processing information including the processing identification information of a function ticket 233 identified by the function ticket number included in the function ticket update demand to "Close" (step S114).

In step S50, the CPU 111 judges whether the to-be-executed processing is the last processing. When the to-be-executed processing is the last processing, the processing proceeds to step S51, and otherwise, the processing proceeds to step S52. In step S51, the CPU 111 transmits a job completion notification to the PC 200, and the processing proceeds to step S52. The job completion notification includes a job number.

In step S52, the CPU 111 executes the restriction releasing processing, and the processing goes back to the job executing processing. The other MFPs 100A, 100B, and 100C, which acquire the function ticket 233 after release of restriction, know on the basis of the state information whether the processing is executed by the MFP 100. Also, the other MFPs 100A, 100B, and 100C, which acquire the data 231 after release of restriction, acquire processed data for which the to-be-executed processing is executed by the MFP 100.

Figure 17:
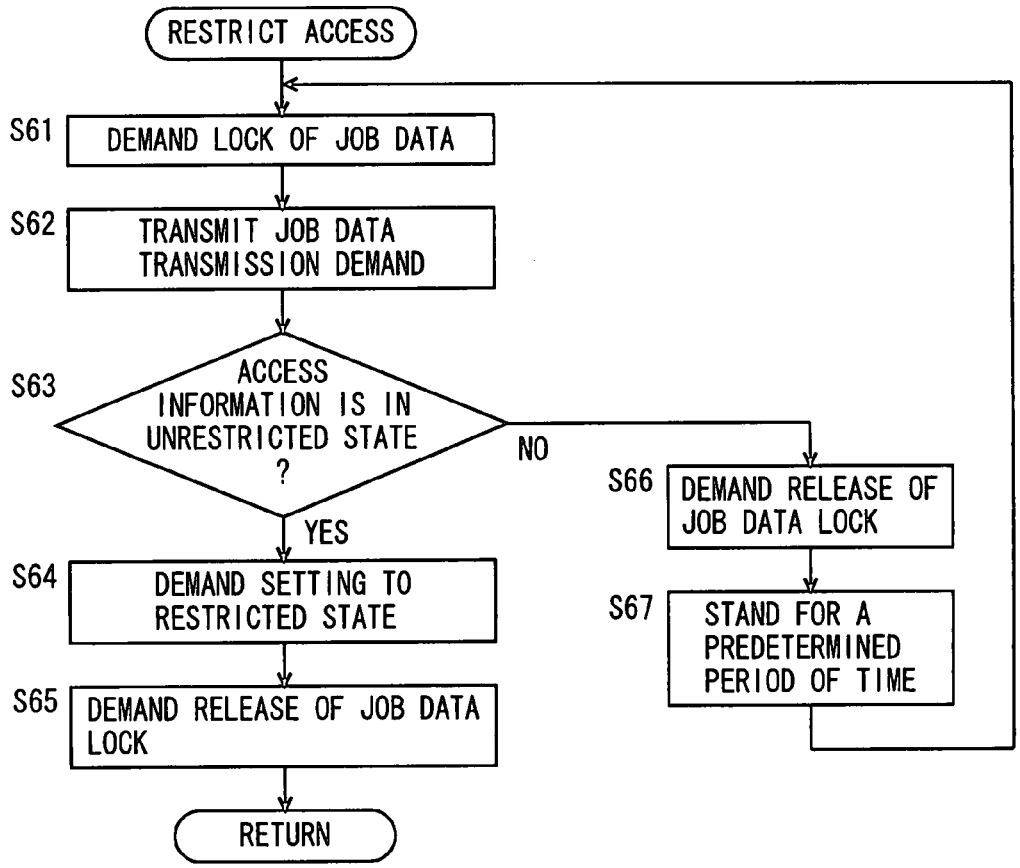
FIG. 17 is a flowchart showing an example of the flow of access restricting processing.

FIG. 17 is a flowchart showing an example of the flow of access restricting processing. The access restricting processing is executed in step S31 shown in FIG. 15 and in step 43 shown in FIG. 16. Referring to FIG. 17, the CPU 111 transmits a job data lock demand to the PC 200 (step S61). The job data lock demand includes the job number of the job data 235. As shown in FIG. 11, upon receiving the job data lock demand (step S121), the PC 200 locks job data 235 identified by the job number included in the job data lock demand (step S124). Thus, in the PC 200 the job data 235 is locked and the MFPs are denied access to the job data 235 except for the MFP 100, which has transmitted the lock demand. Since the PC 200, when unable to lock the job data 235, transmits an error signal (step S125), the CPU 111 of the MFP 100 repeatedly transmits the lock demand until the error signal is not transmitted in response.

The CPU 111 then transmits a job data transmission demand to the PC 200 (step S62). The job data transmission demand includes a job number. As shown in FIG. 12, upon receiving the job data transmission demand (step S131), the PC 200 transmits job data 235 identified by the job number included in the job data transmission demand (step S134), and the MFP 100 receives the job data 235. The CPU 111 then judges whether the access information of the job data 235 is in an unrestricted state (step S63). When Status of the access information is "Open," the access information is in an unrestricted state, and when "Checkout," the access information is in a restricted state. When the access information is in an unrestricted state, the processing proceeds to step S64, and when in a restricted state, the processing proceeds to step S66.

In step S64, the CPU 111 demands the PC 200 to set the access information to be a restricted state, and the processing proceeds to step S65. Specifically, the CPU 111 transmits a restricted state set demand to the PC 200. The restricted state set demand includes a job number. As shown in FIG. 12, upon receiving the restricted state set demand (step S136), the PC 200 changes Status of the access information of job data 235 identified by the job number included in the restricted state set demand to "Checkout," and changes the apparatus identification information to the apparatus identification information "MFP-A," which is for the MFP 100 (step S144).

In step S65, the CPU 111 transmits a job data lock release demand to the PC 200, and the processing goes back to the processing execution processing. The job data lock release demand includes the job number of the job data 235. As shown in FIG. 11, upon receiving the job data lock release demand (step S126), the PC 200 releases the lock of job data 235 identified by the job number included in the job data lock release demand (step S129). Thus, in the PC 200 the lock of the job data 235 is released and any of the MFPs 100, 100A, 100B, and 100C is allowed access to the job data 235. Since the PC 200, when unable to release the lock, transmits an error signal (step S130), the CPU 111 of the MFP 100 repeatedly transmits the job data lock release demand until the error signal is not transmitted in response.

The CPU 111 then transmits to the PC 200 the job data lock release demand for the job data 235 (step S66), and after an elapse of a predetermined period of time (step S67), the processing goes back to step S61. This is because during a predetermined time period of standing, the access information may be changed to an unrestricted state.

Figure 18:
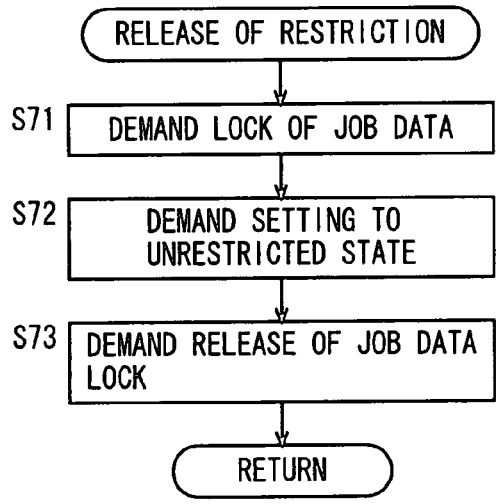
FIG. 18 is a flowchart showing an example of the flow of restriction releasing processing.

FIG. 18 is a flowchart showing an example of the flow of restriction releasing processing. The restriction releasing processing is executed in steps S39 and S41 shown in FIG. 15 and in step S52 shown in FIG. 16. Referring to FIG. 18, the CPU 111 transmits a job data lock demand to the PC 200 (step S71). Thus, in the PC 200 the job data 235 is locked and the MFPs are denied access to the job data 235 except for the MFP 100.

The CPU 111 then demands the PC 200 to set the access information to be an unrestricted state (step S72), and the processing proceeds to step S73. Specifically, the CPU 111 transmits an unrestricted state set demand to the PC 200. The unrestricted state set demand includes a job number. As shown in FIG. 12, upon receiving the unrestricted state set demand (step S141), the PC 200 changes Status of the access information of job data 235 identified by the job number included in the unrestricted state set demand to "Open" (step S144).

In step S73, the CPU 111 transmits a job data lock release demand to the PC 200, and the processing goes back to the processing execution processing. The job data lock release demand includes the job number of the job data 235. Thus, in the PC 200 the lock of the job data 235 is released and the other MFPs 100A, 100B, and 100C than the MFP 100 are allowed access to the job data 235. Since the PC 200, when unable to release the lock, transmits an error signal (step S130), the CPU 111 of the MFP 100 repeatedly transmits the job data lock release demand until the error signal is not transmitted in response.

As described hereinbefore, in the information-processing system 1 according to this embodiment, the PC 200, which is an instructing apparatus, stores data and a function ticket that defines state information denoting the state of processing of each processing identification information. Each of the MFPs 100, 100A, 100B, and 100C, which are processing execution apparatuses, acquires a function ticket, determines executable object processing among the processing defined by the function ticket, and acquires the data in order to execute the object processing. When the object processing is data processing, the apparatus, among the MFPs 100, 100A, 100B, and 100C, that has executed the object processing updates the data stored in the instructing apparatus with processed data for which the object processing has been executed, and updates the state information that is defined by the function ticket stored in the PC 200 and corresponds to the object processing with a processed state. Thus, each of the MFPs 100, 100A, 100B, and 100C determines object processing on the basis of state information defined by the function ticket, which eliminates the need for determination by the PC 200 of which of the MFPs 100, 100A, 100B, and 100C to cause to execute the object processing. This reduces load off the PC 200. Further, the plurality of the MFPs 100, 100A, 100B, and 100C only need to determine the object processing when the load of each apparatus becomes small, which eliminates the need for monitoring by the PC 200 of the load of the plurality of the MFPs 100, 100A, 100B, and 100C. This reduces load off the PC 200, and at the same time, reduces the amount of communication between the PC 200 and the plurality of the MFPs 100, 100A, 100B, and 100C.

Each of the plurality of the MFPs 100, 100A, 100B, and 100C selects and executes processing, among the processing defined by the function ticket, whose state information is not "Close," which prevents duplicitous execution of the same processing by the plurality of the MFPs 100, 100A, 100B, and 100C.

When priority information is set for the processing information defined by the function ticket, each of the plurality of the MFPs 100, 100A, 100B, and 100C selects and executes processing, among the processing defined by the function ticket, whose state information is not "Close" and that has the highest priority for execution. This enables it to execute a plurality of pieces of processing in a predetermined order.

When the processing, among the processing defined by the function ticket, whose state information is not "Close" is apparatus designating processing, each of the plurality of the MFPs 100, 100A, 100B, and 100C selects and executes processing in which no other apparatus is designated. This enables it to cause a predetermined apparatus to execute the processing.

The PC 200 stores job data that includes access information denoting either a restricted state in which access to the data 231 is restricted to one of the plurality of the MFPs 100, 100A, 100B, and 100C or an unrestricted state in which no restriction is made. Each of the plurality of the MFPs 100, 100A, 100B, and 100C acquires the job data 235, and on condition that the access information of the acquired job data 235 is in an unrestricted state, changes the access information to a restricted state in which access to the job data 235 is restricted to each apparatus. Since access to the data 231 is restricted to either one of the plurality of MFPs 100, 100A, 100B, and 100C, reading or writing of the data 231 can be controlled exclusively.

While in this embodiment description has been made of the example where the instructing apparatus for transmitting the execution instruction is the PC 200 and the executing apparatuses for executing processing are the MFPs 100, 100A, 100B, and 100C, it is possible to set one of the MFPs 100, 100A, 100B, and 100C, e.g., the MFP 100, to be the instructing apparatus. It is also possible that image data and a processing condition are received from the PC 200 by, for example, the MFP 100A so that the MFP 100A becomes the instructing apparatus. In this case, in which the MFP 100A is set to be the instructing apparatus, the PC 200, the other MFPs 100, 100B, and 100C are the executing apparatuses. Further, while the data receiving portion 211 is formed in the CPU 111 of the MFP 100A, the data receiving portion 211 can be adapted to: receive image data, which is received from the PC 200 or the other MFPs 100, 100B, 100C connected to the MFP 100A via the LAN terminal 118, from the data communication controlling portion 117; receive image data, which is output from the image reading portion 20 after reading text, from the image reading portion 20; receive facsimile data, which is received by the facsimile portion 60, from the facsimile portion 60; or receive image data stored in the memory card 119A from the data communication controlling portion 117.

While in the above embodiment description has been made of an information-processing system, it will be readily appreciated that the present invention can be taken as the information-processing method shown in FIGS. 10 to 16 or as an information-processing program to cause the PC 200 or the MFPs 100, 100A, 100B, and 100C to execute the information-processing method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information-processing system including an instructing apparatus to instruct execution of processing and a plurality of processing execution apparatuses to execute processing in accordance with an instruction for executing processing, wherein:
    said instructing apparatus comprises:
    a processing condition receiving portion to receive data to be processed and at least one piece of processing identification information for identifying at least one piece of processing to be executed for said data;
    a definition data generating portion to generate definition data defining state information denoting a state of processing for each of said at least one piece of received processing identification information;
    a data storing portion to store said data; and
    a definition data storing portion to store said definition data in association with said data stored in said data storing portion; and
    said plurality of processing execution apparatuses each comprise:
    a definition data acquiring portion to acquire said definition data;
    an object processing determining portion to determine executable object processing from among said at least one piece of processing to be executed for said data on the basis of the state information defined by said acquired definition data;
    a data acquiring portion to acquire said data;
    a processing executing portion to execute said object processing for said acquired data;
    a data update instructing portion to, when said object processing is data processing, instruct to update said data stored in said data storing portion of said instructing apparatus with processed data having undergone said object processing executed by said processing executing portion; and
    a definition data update instructing portion to instruct to update state information denoting a state of said object processing, having been executed for said processed data, with an executed state, said object processing being defined by said definition data stored in association with said processed data in said definition data storing portion of said instructing apparatus.

2. The information-processing system according to claim 1, wherein said object processing determining portion selects, among said at least one piece of processing defined by said definition data, processing having a yet-to-be executed processing state.

3. The information-processing system according to claim 2, wherein when said definition data includes priority information defining an order of execution for at least a part of said at least one piece of processing, said object processing determining portion determines, among said selected processing having a yet-to-be executed processing state, a piece of processing having highest priority for execution as object processing.

4. The information-processing system according to claim 2, wherein when said at least one piece of processing defined by said definition data includes executing-apparatus designating information designating either one of said plurality of processing execution apparatuses, said object processing determining portion selects, among said selected yet-to-be executed processing state, a piece of processing whose executing-apparatus designating information does not designate another processing execution apparatus than said object processing determining portion's own processing execution apparatus.

5. The information-processing system according to claim 1, wherein:
    said instructing apparatus further comprises an access information storing portion to store access information denoting either a restricted state in which access to said data is restricted to one of said plurality of processing execution apparatuses or an unrestricted state in which no access restriction is made;
    said plurality of processing execution apparatuses each further comprises:
    an access information acquiring portion to acquire said access information;
    an access restricting portion to change said access information to a restricted state in which access to said data is restricted to said access restricting portion's own processing execution apparatus on condition that said acquired access information denotes an unrestricted state; and
    a releasing portion to change said access information from said restricted state to said unrestricted state;
    said data acquiring portion demands said instructing apparatus to transmit said data on condition that said access information denotes said restricted state in which access to said data is restricted to said data acquiring portion's own processing execution apparatus;
    said data update instructing portion instructs to update said data with said processed data on condition that said access information denotes said restricted state in which access to said data is restricted to said data update instructing portion's own processing execution apparatus; and
    said definition data update instructing portion instructs to update state information corresponding to said object processing defined by said definition data with an executed state on condition that said access information denotes said restricted state in which access to said data is restricted to said definition data update instructing portion's own processing execution apparatus.

6. The information-processing system according to claim 1, wherein said instructing apparatus further comprises:
    a job data storing portion to store job data for associating definition data identification information for identifying said definition data with data identification information for identifying said data; and
    an execution instructing portion to transmit to said plurality of processing execution apparatuses an execution instruction including job identification information for identifying said job data.

7. The information-processing system according to claim 6, wherein said execution instruction further includes said data identification information and said definition data identification information.

8. A processing execution apparatus comprising:
an execution instruction receiving portion to receive an execution instructing information including: definition data identification information for identifying definition data defining state information denoting a state of processing for each of at least one piece of processing identification information for identifying at least one piece of processing to be executed for data stored in a data storing portion of an instructing apparatus, said instructing apparatus including a definition data storing portion to store said definition data in association with said data stored in said data storing portion; and data identification information for identifying said data, said execution instructing information being received from said instructing apparatus;
a definition data acquiring portion to acquire said definition data identified by said definition data identification information included in said received execution instructing information;
an object processing determining portion to determine executable object processing from among said at least one piece of processing to be executed for said data on the basis of the state information defined by said acquired definition data;
a data acquiring portion to acquire from said instructing apparatus said data identified by said data identification information included in said received execution instructing information;
a processing executing portion to execute said object processing for said acquired data;
a data update instructing portion to, when said object processing is data processing, instruct to update said data stored in said data storing portion of said instructing apparatus with processed data having undergone said object processing executed by said processing executing portion; and
a definition data update instructing portion to instruct to update state information denoting a state of said object processing, having been executed for said processed data, with an executed state, said object processing being defined by said definition data stored in association with said processed data in said definition data storing portion of said instructing apparatus.

9. A processing executing method for executing processing in an information-processing system including an instructing apparatus to instruct execution of processing and a plurality of processing execution apparatuses to execute processing in accordance with an instruction for executing processing, wherein:
said method causes said instructing apparatus to execute steps of:
receiving data to be processed and at least one piece of processing identification information for identifying at least one piece of processing to be executed for said data;
generating definition data defining state information denoting a state of processing for each of said at least one piece of received processing identification information;
storing said data in a data storing portion;
storing said definition data in a definition data storing portion in association with said data stored in said data storing portion; and
said method causes each of said plurality of processing execution apparatuses to execute steps of:
acquiring said definition data;
determining executable object processing from among said at least one piece of processing to be executed for said data on the basis of state information defined by said acquired definition data;
acquiring said data;
executing, upon receiving said data, said object processing for said acquired data;
instructing, when said object processing is data processing, to update said data stored in said instructing apparatus with processed data having undergone said object processing; and
instructing to update state information denoting a state of said object processing, having been executed for said processed data, with an executed state, said object processing being defined by said definition data stored in association with said processed data in said definition data storing portion in said instructing apparatus.

10. A nontransitory computer-readable recording medium encoded with a program causing a computer to execute processing comprising steps of:
receiving an execution instructing information including: definition data identification information for identifying definition data defining state information denoting a state of processing for each of at least one piece of processing identification information for identifying at least one piece of processing executed for object data stored in a processing instructing apparatus; and data identification information for identifying said object data, said execution instructing information being received from said processing instructing apparatus;
acquiring said definition data identified by said definition data identification information included in said received execution instructing information;
determining executable object processing from among said at least one piece of processing to be executed for said data on the basis of the state information defined by said acquired definition data;
acquiring from said processing instructing apparatus said object data identified by said data identification information included in said received execution instructing information;
executing said object processing for said acquired object data;
instructing, when said object processing is data processing, said processing instructing apparatus to update said object data stored in said processing instructing apparatus with processed data having undergone said object processing executed by said processing executing portion; and
instructing said processing instructing apparatus to update state information denoting state of said object processing, having been executed for said processed data, with an executed state, said object processing being defined by said definition data stored in association with said processed object data in said processing instructing apparatus.

* * * * *